(12) United States Patent
Huang et al.

(10) Patent No.: US 9,994,114 B2
(45) Date of Patent: *Jun. 12, 2018

(54) SYSTEMS AND METHODS FOR BI-STATE IMPEDANCE CONVERSION IN WIRELESS POWER TRANSFER

(71) Applicant: QUALCOMM Incorporated, San Diego, CA (US)

(72) Inventors: Chang-Yu Huang, Auckland (NZ); Jonathan Beaver, Auckland (NZ); Nicholas Athol Keeling, Auckland (NZ); Mickel Bipin Budhia, Auckland (NZ); Michael Le Gallais Kissin, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/084,982

(22) Filed: Mar. 30, 2016

(65) Prior Publication Data

US 2016/0272072 A1    Sep. 22, 2016

Related U.S. Application Data

(63) Continuation of application No. 14/027,097, filed on Sep. 13, 2013, now Pat. No. 9,302,591.

(51) Int. Cl.
*H02J 50/12* (2016.01)
*B60L 11/18* (2006.01)
(Continued)

(52) U.S. Cl.
CPC ......... *B60L 11/182* (2013.01); *B60L 11/1829* (2013.01); *B60L 11/1833* (2013.01);
(Continued)

(58) Field of Classification Search
CPC . H02J 5/005; H02J 7/025; H02J 17/00; B60L 11/182
See application file for complete search history.

(56) References Cited

U.S. PATENT DOCUMENTS

| | | | |
|---|---|---|---|
| 6,777,911 B2 | 8/2004 | Lewis et al. | |
| 2009/0284220 A1 | 11/2009 | Toncich et al. | |

(Continued)

FOREIGN PATENT DOCUMENTS

| | | |
|---|---|---|
| CN | 101917070 A | 12/2010 |
| CN | 102882286 A | 1/2013 |

(Continued)

OTHER PUBLICATIONS

English machine translation of KR20130087708, published Aug. 7, 2013.*

(Continued)

*Primary Examiner* — Rexford Barnie
*Assistant Examiner* — David Shiao
(74) *Attorney, Agent, or Firm* — Knobbe, Martens, Olson & Bear, LLP

(57) ABSTRACT

One aspect provides a wireless power transmitter. The wireless power transmitter includes a transmit antenna configured to generate a field for wireless transmit power in both a first and second configuration. The wireless power transmitter further includes a first capacitor. The wireless power transmitter further includes at least one switch configured to selectively connect the first capacitor in one of the first and second configuration, the first capacitor being in parallel with the transmit antenna in the first configuration and in series with the transmit antenna in the second configuration. The wireless power transmitter further includes a second capacitor in parallel with the transmit antenna and a transformer configured to operate at a first turns-ratio in the first (Continued)

configuration and a second turns-ratio in the second configuration, the first turns-ratio being lower than the second turns-ratio.

30 Claims, 16 Drawing Sheets

(51) Int. Cl.
| | | |
|---|---|---|
| *H01F 38/14* | (2006.01) | |
| *H02J 7/02* | (2016.01) | |
| *H02J 17/00* | (2006.01) | |
| *H02J 50/10* | (2016.01) | |

(52) U.S. Cl.
CPC .......... *B60L 11/1838* (2013.01); *H01F 38/14* (2013.01); *H02J 7/025* (2013.01); *H02J 17/00* (2013.01); *H02J 50/10* (2016.02); *H02J 50/12* (2016.02); *B60L 2230/10* (2013.01); *B60L 2270/147* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(56) References Cited

U.S. PATENT DOCUMENTS

| | | |
|---|---|---|
| 2009/0284369 A1 | 11/2009 | Toncich et al. |
| 2010/0184371 A1 | 7/2010 | Cook et al. |
| 2011/0260682 A1 | 10/2011 | Low et al. |
| 2012/0001495 A1* | 1/2012 | Urano ............... H02J 5/005 307/104 |
| 2012/0038220 A1* | 2/2012 | Kim .................. H02J 7/025 307/104 |
| 2012/0056486 A1 | 3/2012 | Endo et al. |
| 2012/0161696 A1 | 6/2012 | Cook et al. |
| 2012/0299557 A1 | 11/2012 | Kwon et al. |
| 2013/0009609 A1 | 1/2013 | Andersen et al. |
| 2013/0027078 A1 | 1/2013 | Nakano et al. |
| 2013/0033118 A1 | 2/2013 | Karalis et al. |
| 2013/0076306 A1 | 3/2013 | Lee et al. |
| 2015/0077046 A1 | 3/2015 | Huang et al. |

FOREIGN PATENT DOCUMENTS

| | | |
|---|---|---|
| CN | 103219807 A | 7/2013 |
| CN | 102570624 B | 8/2015 |
| JP | 2012055157 A | 3/2012 |
| JP | 2012518382 A | 8/2012 |
| JP | 2013215049 A | 10/2013 |
| JP | 2014527793 A | 10/2014 |
| JP | 2015139345 A | 7/2015 |
| KR | 20130033867 A | 4/2013 |
| KR | 20130087708 A | 8/2013 |
| WO | WO-2009140217 A2 | 11/2009 |
| WO | WO-2012058466 A1 | 5/2012 |
| WO | WO-2013020138 A2 | 2/2013 |
| WO | WO-2013115419 A1 | 8/2013 |

OTHER PUBLICATIONS

International Search Report and Written Opinion—PCT/US2014/054787—ISA/EPO—Dec. 4, 2014.

* cited by examiner

SYSTEMS AND METHODS FOR BI-STATE IMPEDANCE CONVERSION IN WIRELESS POWER TRANSFER

CROSS REFERENCE TO RELATED APPLICATIONS

This application is a continuation of U.S. patent application Ser. No. 14/027,097 entitled "SYSTEMS AND METHODS FOR BI-STATE IMPEDANCE CONVERSION IN WIRELESS POWER TRANSFER" filed on Sep. 13, 2013, the disclosure of which is hereby incorporated by reference in its entirety.

FIELD

The present disclosure relates generally to wireless power transfer, and more specifically to devices, systems, and methods related to varying a ratio of inverter output current to inverter bridge voltage.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors can sometimes be inconvenient or cumbersome and have other drawbacks. Wireless charging systems that are capable of transferring power in free space (e.g., via a wireless field) to be used to charge electric vehicles can overcome some of the deficiencies of wired charging solutions.

In some designs, an electric vehicle can be configured to receive charge through both a wired power supply and a wireless power supply. Various dual-source electric vehicles can receive wired and wireless power either alternately or simultaneously. As such, wireless charging systems and methods that efficiently and effectively facilitate reception, conditioning, and storage of wired and wireless power are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect provides a wireless power transmitter. The wireless power transmitter includes a transmit antenna configured to generate a field for wireless transmit power in both a first and second configuration. The wireless power transmitter further includes a first capacitor. The wireless power transmitter further includes at least one switch configured to selectively connect the first capacitor in one of the first and second configuration, the first capacitor being in parallel with the transmit antenna in the first configuration and in series with the transmit antenna in the second configuration. The first capacitor can be in series with the transmit antenna in the first configuration and in parallel with the transmit antenna in the second configuration. The wireless power transmitter further includes a transformer configured to operate at a first turns-ratio in the first configuration and a second turns-ratio in the second configuration, the first turns-ratio being lower than the second turns-ratio.

In an embodiment, the wireless power transmitter can further include a second capacitor in parallel with the transmit antenna. The first capacitor can be in series with the second capacitor in the first configuration and in parallel with the second capacitor in the second configuration. In an embodiment, the wireless power transmitter can further include a third capacitor in series with the at least one switch. In an embodiment, the third capacitor can be configured to compensate for an additional reactive loading present in the first configuration. In an embodiment, the at least one switch can be not part of a resonant path.

Another aspect provides a method of transmitting wireless charging power in a wireless power transmitter. The method includes generating, at a transmit antenna, a field for wireless transmit power in both a first and second configuration. The method further includes selectively connecting a first capacitor in one of the first and second configuration. The first capacitor is in parallel with the transmit antenna in the first configuration and in series with the transmit antenna in the second configuration.

In an embodiment, the method can further include connecting the first capacitor in series with a second capacitor in the first configuration and in parallel with the second capacitor in the second configuration. The second capacitor can be in parallel with the transmit antenna. In an embodiment, the method can further include configuring a transformer to operate at a first turns-ratio in the first configuration and a second turns-ratio in the second configuration, the first turns-ratio being higher than the second turns-ratio. In an embodiment, the wireless power transmitter can include a third capacitor in series with at least one switch. In an embodiment, the third capacitor can be configured to compensate for an additional reactive loading present in the first configuration. In an embodiment, connecting can be via at least one switch can be not part of a resonant path.

Another aspect provides an apparatus for transmitting wireless charging power. The apparatus includes a first capacitor. The apparatus further includes means for generating a field for wireless transmit power in both a first and second configuration. The apparatus further includes means for selectively connecting the first capacitor in one of the first and second configuration. The first capacitor is in parallel with the means for generating in the first configuration and in series with the means for generating in the second configuration. The apparatus further includes means for operating at a first turns-ratio in the first configuration and a second turns-ratio in the second configuration, the first turns-ratio being higher than the second turns-ratio.

In an embodiment, the apparatus can further include a second capacitor and means for connecting the first capacitor in series with a second capacitor in the first configuration and in parallel with the second capacitor in the second configuration. The second capacitor can be in parallel with the means for generating. In an embodiment, the apparatus can further include a third capacitor in series with the means for connecting. In an embodiment, the third capacitor can be configured to compensate for an additional reactive loading present in the first configuration. In an embodiment, the means for connecting can be not part of a resonant path.

Another aspect provides a non-transitory computer-readable medium including code that, when executed, causes an apparatus to generate, at a transmit antenna, a field for wireless transmit power in both a first and second configuration. The medium further includes code that, when executed, causes the apparatus to selectively connect a first capacitor in one of the first and second configuration. The first capacitor is in parallel with the transmit antenna in the first configuration and in series with the transmit antenna in the second configuration. The medium can further include code that, when executed, causes the apparatus to configure a transformer to operate at a first turns-ratio in the first configuration and a second turns-ratio in the second configuration, the first turns-ratio being higher than the second turns-ratio.

In an embodiment, the medium can further include code that, when executed, causes the apparatus to connect the first capacitor in series with a second capacitor in the first configuration and in parallel with the second capacitor in the second configuration. The second capacitor can be in parallel with the transmit antenna. In an embodiment, the apparatus can include a third capacitor in series with at least one switch. In an embodiment, the third capacitor can be configured to compensate for an additional reactive loading present in the first configuration.

Figure 1:
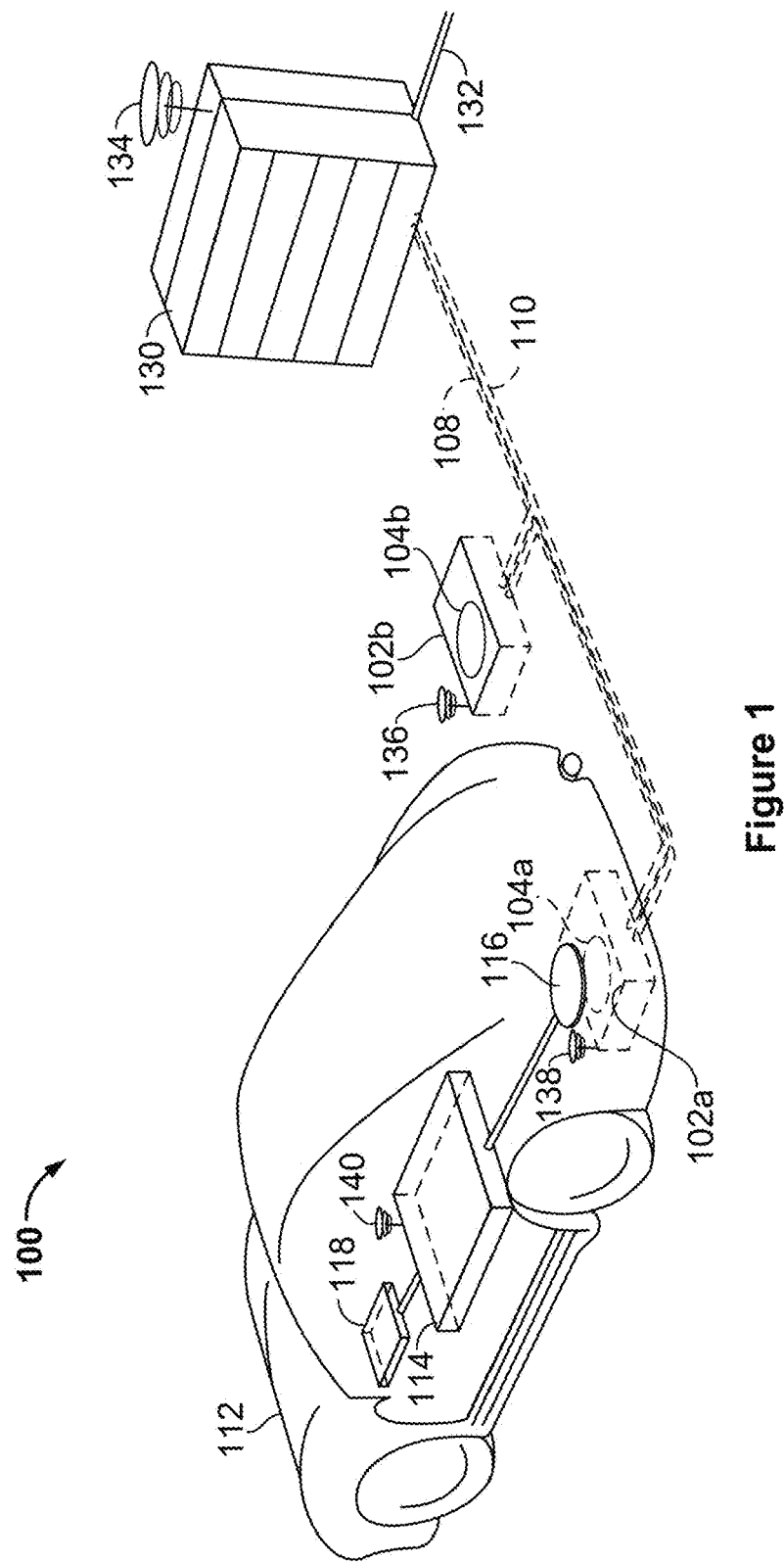
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features can be arbitrarily expanded or reduced for clarity. In addition, some of the drawings may not depict all of the components of a given system, method or device. Finally, like reference numerals can be used to denote like features throughout the specification and figures.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power can refer to transferring any form of energy associated with electric fields, magnetic fields, electromagnetic fields, or otherwise from a transmitter to a receiver without the use of physical electrical conductors (e.g., power can be transferred through free space). The power output into a wireless field (e.g., a magnetic field) can be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles can be hybrid electric vehicles that include besides electric motors, a traditional combustion engine for direct locomotion or to charge the vehicle's battery. Other electric vehicles can draw all locomotion ability from electrical power. An electric vehicle is not limited to an automobile and can include motorcycles, carts, scooters, and the like. By way of example and not limitation, a remote system is described herein in the form of an electric vehicle (EV). Furthermore, other remote systems that can be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 can be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power and an antenna 136. An electric vehicle 112 can include a battery unit 118, an electric vehicle induction coil 116, an electric vehicle wireless charging system 114, and an antenna 140. The electric vehicle induction coil 116 can interact with the base system induction coil 104a for example, via a region of the electromagnetic field generated by the base system induction coil 104a.

In some exemplary embodiments, the electric vehicle induction coil 116 can receive power when the electric vehicle induction coil 116 is located in an energy field produced by the base system induction coil 104a. The field corresponds to a region where energy output by the base system induction coil 104a can be captured by an electric vehicle induction coil 116. For example, the energy output by the base system induction coil 104a can be at a level sufficient to charge or power the electric vehicle 112 (e.g., to charge the battery unit 118). In some cases, the field can correspond to the "near field" of the base system induction coil 104a. The near-field can correspond to a region in which there are strong reactive fields resulting from the currents and charges in the base system induction coil 104a that do not radiate power away from the base system induction coil 104a. In some cases the near-field can correspond to a region that is within about $\frac{1}{2}\pi$ of wavelength of the base system induction coil 104a (and vice versa for the electric vehicle induction coil 116) as will be further described below.

Local distribution center 130 can be configured to communicate with external sources (e.g., a power grid) via a communication backhaul 134, and with the base wireless charging system 102a via a communication link 108.

Base wireless charging systems 102a and 102b can be configured to communicate with the electric vehicle wireless charging system 114 via antennas 136 and 138. For example, the wireless charging system 102a can communicate with the electric vehicle wireless charging system 114 using a communication channel between antennas 138 and 140. The communication channels can be any type of communication channels such as, for example, Bluetooth, zigbee, cellular, wireless local area network (WLAN), etc. In various embodiments, the base wireless charging systems 102a and 102b can include any of the base wireless charging systems 802, 902A, 1002A, 1202A, and/or 1302, described herein with respect to FIGS. 8, 9, 10, 12, and 13, respectively.

In some embodiments the electric vehicle induction coil 116 can be aligned with the base system induction coil 104a and, therefore, disposed within a near-field region simply by the driver positioning the electric vehicle 112 correctly relative to the base system induction coil 104a. In other embodiments, the driver can be given visual feedback, auditory feedback, or combinations thereof to determine when the electric vehicle 112 is properly placed for wireless power transfer. In yet other embodiments, the electric vehicle 112 can be positioned by an autopilot system, which can move the electric vehicle 112 back and forth (e.g., in zig-zag movements) until an alignment error has reached a tolerable value. This can be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof can have functionality for displacing and moving the induction coils 116 and 104a relative to each other to more accurately orient them and develop more efficient coupling therebetween.

The base wireless charging system 102a can be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly can provide numerous benefits. For example, charging can be performed automatically, virtually without driver intervention and manipulations thereby improving convenience to a user. There can also be no exposed electrical contacts and no mechanical wear out, thereby improving reliability of the wireless power transfer system 100. Manipulations with cables and connectors may not be needed, and there can be no cables, plugs, or sockets that can be exposed to moisture and water in an outdoor environment, thereby improving safety. There can also be no sockets, cables, and plugs visible or accessible, thereby reducing potential vandalism of power charging devices. Further, since an electric vehicle 112 can be used as distributed storage devices to stabilize a power grid, a docking-to-grid solution can be used to increase availability of vehicles for Vehicle-to-Grid (V2G) operation.

A wireless power transfer system 100 as described with reference to FIG. 1 can also provide aesthetical and non-impedimental advantages. For example, there can be no charge columns and cables that can be impedimental for vehicles and/or pedestrians.

As a further explanation of the vehicle-to-grid capability, the wireless power transmit and receive capabilities can be configured to be reciprocal such that the base wireless charging system 102a transfers power to the electric vehicle 112 and the electric vehicle 112 transfers power to the base wireless charging system 102a e.g., in times of energy shortfall. This capability can be useful to stabilize the power distribution grid by allowing electric vehicles to contribute power to the overall distribution system in times of energy shortfall caused by over demand or shortfall in renewable energy production (e.g., wind or solar).

Figure 2:
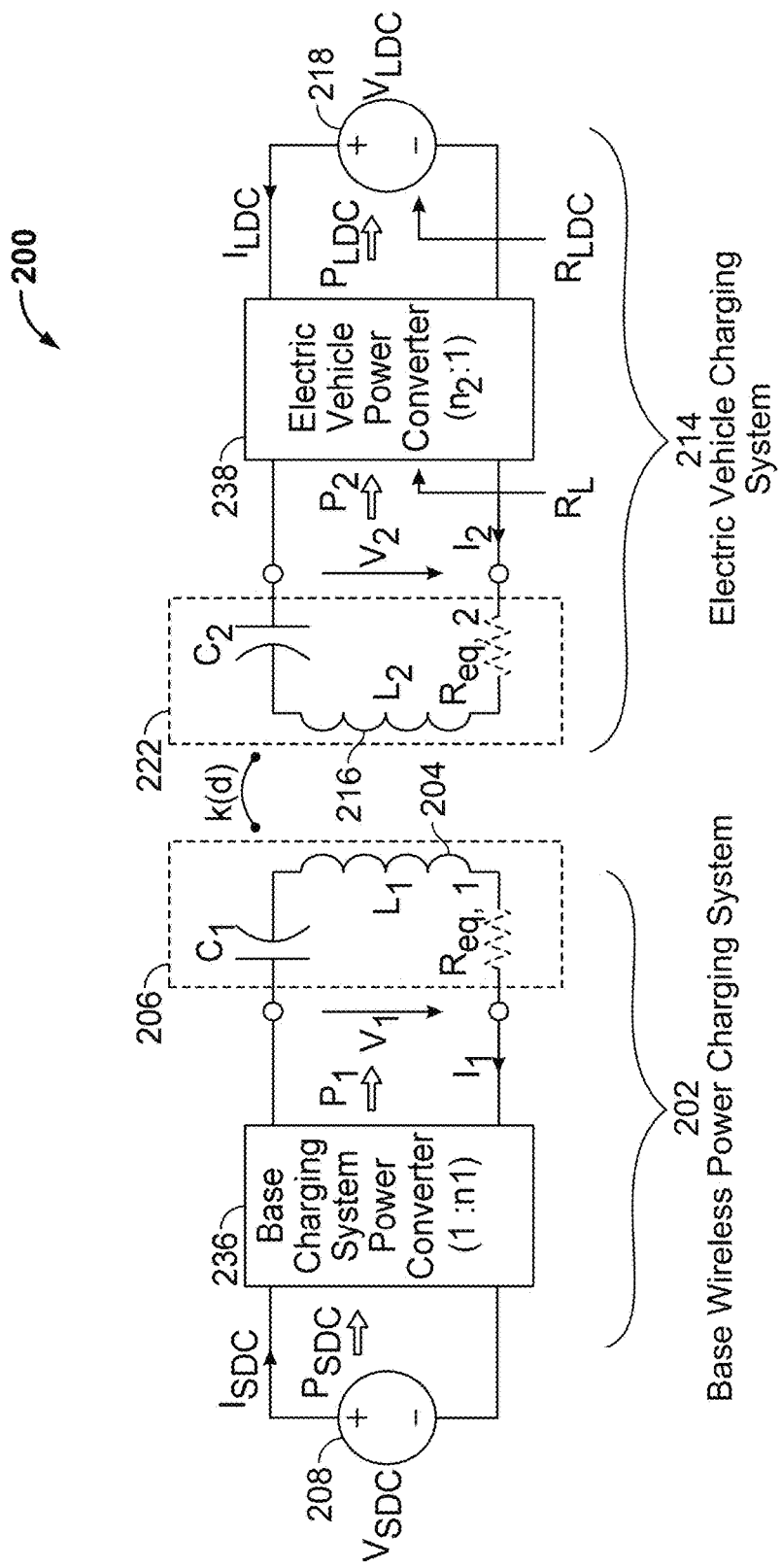
FIG. 2 is a schematic diagram of exemplary components of the wireless power transfer system of FIG. 1.

FIG. 2 is a schematic diagram of exemplary components of the wireless power transfer system 100 of FIG. 1. As shown in FIG. 2, the wireless power transfer system 200 can include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein can use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils can be used for the electric vehicle induction coil 216 and the base system induction coil 204. Using resonant structures for coupling energy can be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 can transfer power to the base wireless charging system 102a. In various embodiments, the base wireless charging system 202 can include any of the base wireless charging systems 802, 902A, 1002A, 1202A, and/or 1302, described herein with respect to FIGS. 8, 9, 10, 12, and 13, respectively.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 can include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ can be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 can be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 can be tuned to substantially the same frequencies and can be positioned within the near-field of an electromagnetic field transmitted by one of the base system induction coil 204 and the electric vehicle induction coil 116. In this case, the base system induction coil 204 and electric vehicle induction coil 116 can become coupled to one another such that power can be transferred to the electric vehicle receive circuit 222 including capacitor $C_2$ and electric vehicle induction coil 116. The capacitor $C_2$ can be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that can be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 can include, among other things, a LF/DC converter configured to convert power at an operating frequency back to DC power at a voltage level matched to the voltage level of an electric vehicle battery unit 218. The electric vehicle power converter 238 can provide the converted power $P_{LDC}$ to charge the electric vehicle battery unit 218. The power supply 208, base charging system power converter 236, and base system induction coil 204 can be stationary and located at a variety of locations as discussed above. The battery unit 218, electric vehicle power converter 238, and electric vehicle induction coil 216 can be included in an electric vehicle charging system 214 that is part of electric vehicle 112 or part of the battery pack (not shown). The electric vehicle charging system 214 can also be configured to provide power wirelessly through the electric vehicle induction coil 216 to the base wireless power charging system 202 to feed power back to the grid. Each of the electric vehicle induction coil 216 and the base system induction coil 204 can act as transmit or receive induction coils based on the mode of operation.

While not shown, the wireless power transfer system 200 can include a load disconnect unit (LDU) to safely disconnect the electric vehicle battery unit 218 or the power supply 208 from the wireless power transfer system 200. For example, in case of an emergency or system failure, the LDU can be triggered to disconnect the load from the wireless power transfer system 200. The LDU can be provided in addition to a battery management system for managing charging to a battery, or it can be part of the battery management system.

Further, the electric vehicle charging system 214 can include switching circuitry (not shown) for selectively connecting and disconnecting the electric vehicle induction coil 216 to the electric vehicle power converter 238. Disconnecting the electric vehicle induction coil 216 can suspend charging and also can adjust the "load" as "seen" by the base wireless charging system 102a (acting as a transmitter), which can be used to "cloak" the electric vehicle charging system 114 (acting as the receiver) from the base wireless charging system 102a. The load changes can be detected if the transmitter includes the load sensing circuit. Accordingly, the transmitter, such as a base wireless charging system 202, can have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode can be established between the transmit induction coil and the receive induction coil. The area around the induction coils where this near field coupling can occur is referred to herein as a near field coupling mode region.

While not shown, the base charging system power converter 236 and the electric vehicle power converter 238 can both include an oscillator, a driver circuit such as a power amplifier, a filter, and a matching circuit for efficient coupling with the wireless power induction coil. The oscillator can be configured to generate a desired frequency, which can be adjusted in response to an adjustment signal. The oscillator signal can be amplified by a power amplifier with an amplification amount responsive to control signals. The filter and matching circuit can be included to filter out harmonics or other unwanted frequencies and match the impedance of the power conversion module to the wireless power induction coil. The power converters 236 and 238 can also include a rectifier and switching circuitry to generate a suitable power output to charge the battery.

The electric vehicle induction coil 216 and base system induction coil 204 as described throughout the disclosed embodiments can be referred to or configured as "loop" antennas, and more specifically, multi-turn loop antennas. The induction coils 204 and 216 can also be referred to herein or be configured as "magnetic" antennas. The term "coils" is intended to refer to a component that can wirelessly output or receive energy four coupling to another "coil." The coil can also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas can be configured to include an air core or a physical core such as a ferrite core. An air core loop antenna can allow the placement of other components within the core area. Physical core antennas including ferromagnetic or ferromagnetic materials can allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy can be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency can be based on the inductance and capacitance of a transmit circuit including an induction coil (e.g., the base system induction coil 204) as described above. As shown in FIG. 2, inductance can generally be the inductance of the induction coil, whereas, capacitance can be added to the induction coil to create a resonant structure at a desired resonant frequency. As a non-limiting example, as shown in FIG. 2, a capacitor can be added in series with the induction coil to create a resonant circuit (e.g., the base system transmit circuit 206) that generates an electromagnetic field. Accordingly, for larger diameter induction coils, the value of capacitance needed to induce resonance can decrease as the diameter or inductance of the coil increases. Inductance can also depend on a number of turns of an induction coil. Furthermore, as the diameter of the induction coil increases, the efficient energy transfer area of the near field can increase. Other resonant circuits are possible. As another non limiting example, a capacitor can be placed in parallel between the two terminals of the induction coil (e.g., a parallel resonant circuit). Furthermore an induction coil can be designed to have a high quality (Q) factor to improve the resonance of the induction coil. For example, the Q factor can be 300 or greater.

As described above, according to some embodiments, coupling power between two induction coils that are in the near field of one another is disclosed. As described above, the near field can correspond to a region around the induction coil in which electromagnetic fields exist but may not propagate or radiate away from the induction coil. Near-field coupling-mode regions can correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas can be used.

Figure 3:
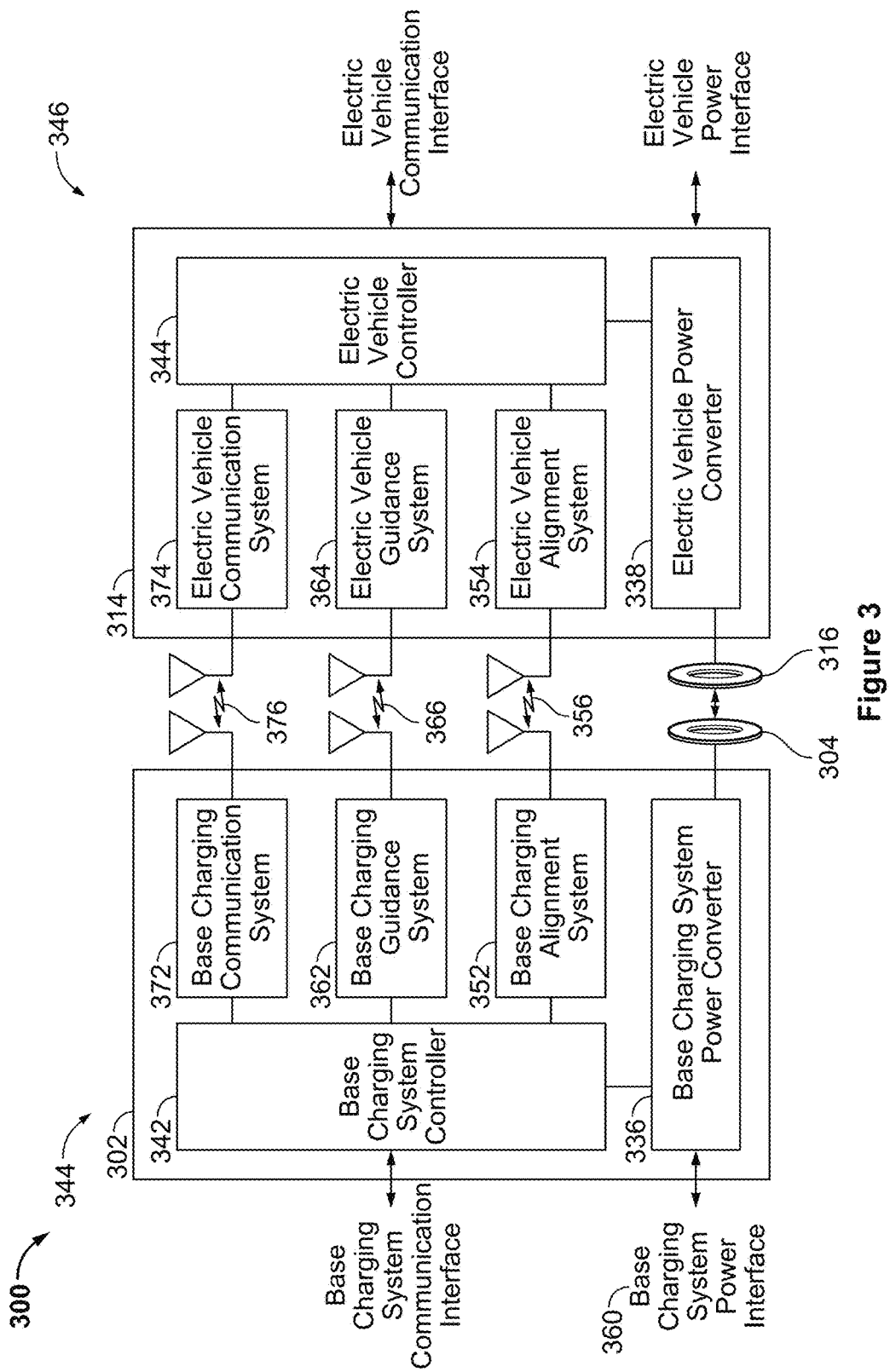
FIG. 3 is another functional block diagram showing exemplary core and ancillary components of the wireless power transfer system of FIG. 1.

FIG. 3 is another functional block diagram showing exemplary core and ancillary components of the wireless power transfer system 100 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 360 can be configured to provide power to a charging system power converter 336 from a power source, such as an AC or DC power supply 126. The base charging system power converter 336 can receive AC or DC power from the base charging system power interface 360 to excite the base system induction coil 304 at or near its resonant frequency. The electric vehicle induction coil 316, when in the near field coupling-mode region, can receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 can include a base charging system communication interface to other systems (not shown) such as, for example, a computer, a wireless device, and a power distribution center, or a smart power grid. The electric vehicle controller 344 can include an electric vehicle communication interface to other systems (not shown) such as, for example, an on-board computer on the vehicle, other battery charging controller, other electronic systems within the vehicles, and remote electronic systems. In various embodiments, the base wireless charging system 302 can include any of the base wireless charging systems 802, 902A, 1002A, 1202A, and/or 1302, described herein with respect to FIGS. 8, 9, 10, 12, and 13, respectively.

The base charging system controller 342 and electric vehicle controller 344 can include subsystems or modules for specific application with separate communication channels. These communications channels can be separate physical channels or separate logical channels. As non-limiting examples, a base charging alignment system 352 can communicate with an electric vehicle alignment system 354 through a communication link 356 to provide a feedback mechanism for more closely aligning the base system induction coil 304 and electric vehicle induction coil 316, either autonomously or with operator assistance. Similarly, a base charging guidance system 362 can communicate with an electric vehicle guidance system 364 through a guidance link 366 to provide a feedback mechanism to guide an operator in aligning the base system induction coil 304 and electric vehicle induction coil 316. In addition, there can be separate general-purpose communication links (e.g., channels), such as communication link 376, supported by base charging communication system 372 and electric vehicle communication system 374 for communicating other information between the base wireless power charging system 302 and the electric vehicle charging system 314. This information can include information about electric vehicle characteristics, battery characteristics, charging status, and power capabilities of both the base wireless power charging system 302 and the electric vehicle charging system 314, as well as maintenance and diagnostic data for the electric vehicle 112. These communication links or channels can be separate physical communication channels such as, for example, Dedicated Short-Range Communications (DSRC), IEEE 802.11x (e.g., Wi-Fi), Bluetooth, zigbee, cellular, infrared, etc.

Electric vehicle controller 344 can also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that can provide higher parking accuracy, thus reducing the need for mechanical horizontal induction coil alignment in any of the base wireless charging system 102a and the electric vehicle charging system 114. Further, electric vehicle controller 344 can be configured to communicate with electronics of the electric vehicle 112. For example, electric vehicle controller 344 can be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 can include detection and sensor systems. For example, the wireless power transfer system 300 can include sensors for use with systems to properly guide the driver or the vehicle to the charging spot, sensors to mutually align the induction coils with the required separation/coupling, sensors to detect objects that can obstruct the electric vehicle induction coil 316 from moving to a particular height and/or position to achieve coupling, and safety sensors for use with systems to perform a reliable, damage free, and safe operation of the system. For example, a safety sensor can include a sensor for detection of presence of animals or children approaching the wireless power induction coils 104a, 116 beyond a safety radius, detection of metal objects near the base system induction coil 304 that can be heated up (induction heating), detection of hazardous events such as incandescent objects on the base system induction coil 304, and temperature monitoring of the base wireless power charging system 302 and electric vehicle charging system 314 components.

The wireless power transfer system 300 can also support plug-in charging via a wired connection. A wired charge port can integrate the outputs of the two different chargers prior to transferring power to or from the electric vehicle 112. Switching circuits can provide the functionality as needed to support both wireless charging and charging via a wired charge port.

To communicate between a base wireless charging system 302 and an electric vehicle charging system 314, the wireless power transfer system 300 can use both in-band signaling and an RF data modem (e.g., Ethernet over radio in an unlicensed band). The out-of-band communication can provide sufficient bandwidth for the allocation of value-added services to the vehicle user/owner. A low depth amplitude or phase modulation of the wireless power carrier can serve as an in-band signaling system with minimal interference.

In addition, some communication can be performed via the wireless power link without using specific communications antennas. For example, the wireless power induction coils 304 and 316 can also be configured to act as wireless communication transmitters. Thus, some embodiments of the base wireless power charging system 302 can include a controller (not shown) for enabling keying type protocol on the wireless power path. By keying the transmit power level (amplitude shift keying) at predefined intervals with a predefined protocol, the receiver can detect a serial communication from the transmitter. The base charging system power converter 336 can include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier can be monitored by the base charging system controller 342 for use in determining whether to enable the oscillator for transmitting energy, to communicate with an active receiver, or a combination thereof.

To enable wireless high power transfer, some embodiments can be configured to transfer power at a frequency in the range from 10-60 kHz. This low frequency coupling can allow highly efficient power conversion that can be achieved using solid state devices. In addition, there can be less coexistence issues with radio systems compared to other bands.

The wireless power transfer system 100 described can be used with a variety of electric vehicles 102 including rechargeable or replaceable batteries.

Figure 4:
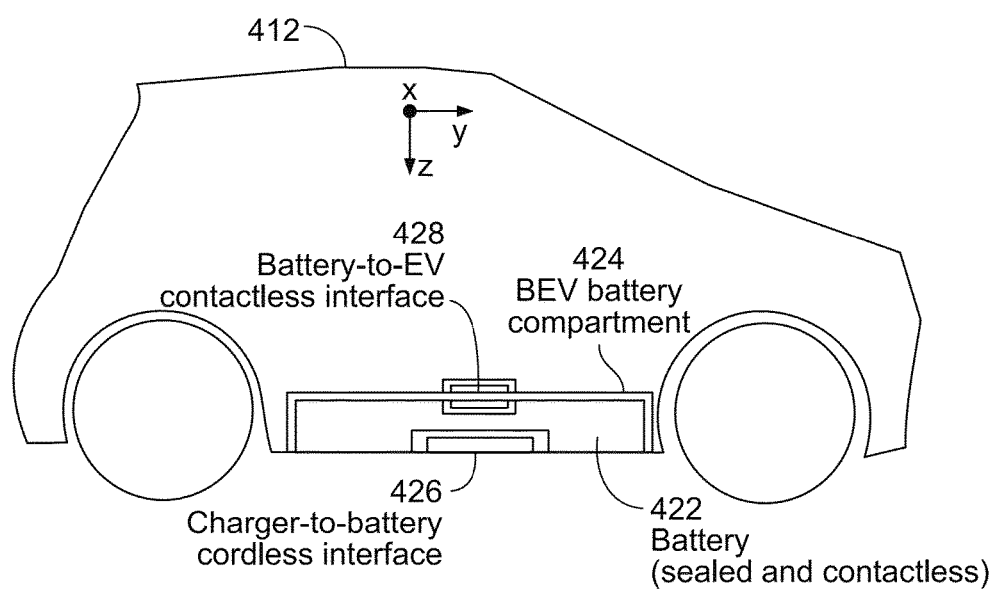
FIG. 4 is a functional block diagram showing a replaceable contactless battery disposed in an electric vehicle, in accordance with an exemplary embodiment of the invention.

FIG. 4 is a functional block diagram showing a replaceable contactless battery disposed in an electric vehicle 412, in accordance with an exemplary embodiment of the invention. In this embodiment, the low battery position can be useful for an electric vehicle battery unit that integrates a wireless power interface (e.g., a charger-to-battery cordless interface 426) and that can receive power from a charger (not shown) embedded in the ground. In FIG. 4, the electric vehicle battery unit can be a rechargeable battery unit, and can be accommodated in a battery compartment 424. The electric vehicle battery unit also provides a wireless power interface 426, which can integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It can be useful for the electric vehicle induction coil to be integrated flush with a bottom side of electric vehicle battery unit or the vehicle body so that there are no protrusive parts and so that the specified ground-to-vehicle body clearance can be maintained. This configuration can require some room in the electric vehicle battery unit dedicated to the electric vehicle wireless power subsystem. The electric vehicle battery unit 422 can also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 can be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 can need to be reduced to improve coupling. Thus, in some embodiments, the base system induction coil 104a and/or the electric vehicle induction coil 116 can be deployable and/or moveable to bring them into better alignment.

Figure 5A:
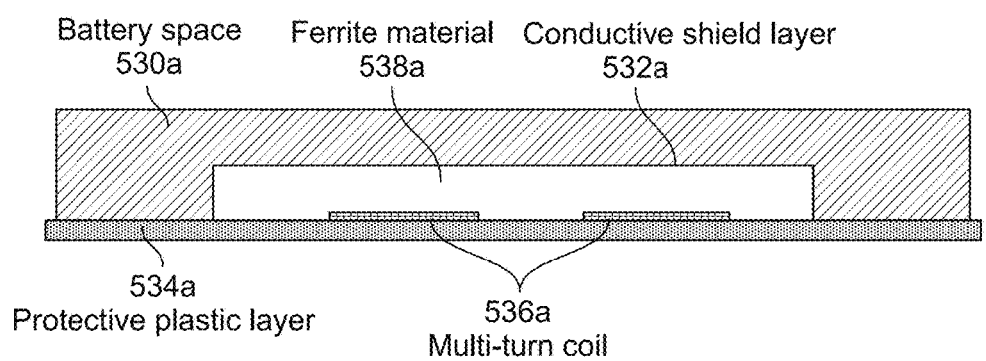
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil can include a ferrite material 538a and a coil 536a wound about the ferrite material 538a. The coil 536a itself can be made of stranded Litz wire. A conductive shield layer 532a can be provided to protect passengers of the vehicle from excessive EMF transmission. Conductive shielding can be particularly useful in vehicles made of plastic or composites.

Figure 5B:
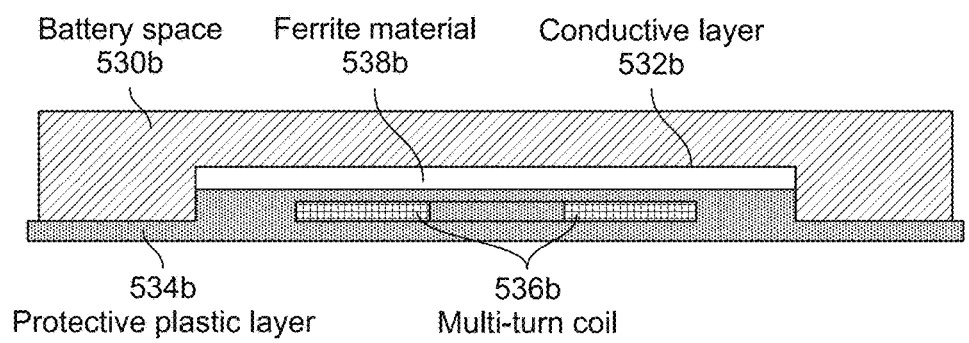

FIG. 5B shows an optimally dimensioned ferrite plate (i.e., ferrite backing) to enhance coupling and to reduce eddy currents (heat dissipation) in the conductive shield 532b. The coil 536b can be fully embedded in a non-conducting non-magnetic (e.g., plastic) material. For example, as illustrated in FIG. 5A-5D, the coil 536b can be embedded in a protective housing 534b. There can be a separation between the coil 536b and the ferrite material 538b as the result of a trade-off between magnetic coupling and ferrite hysteresis losses.

Figure 5C:
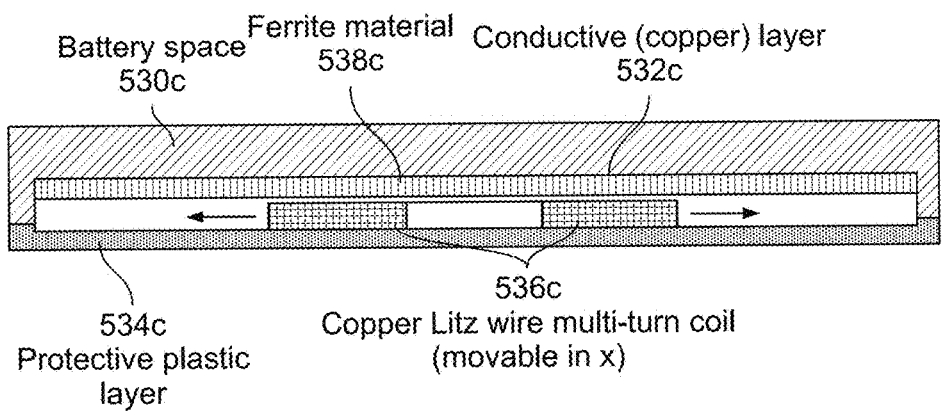
Figure 5D:
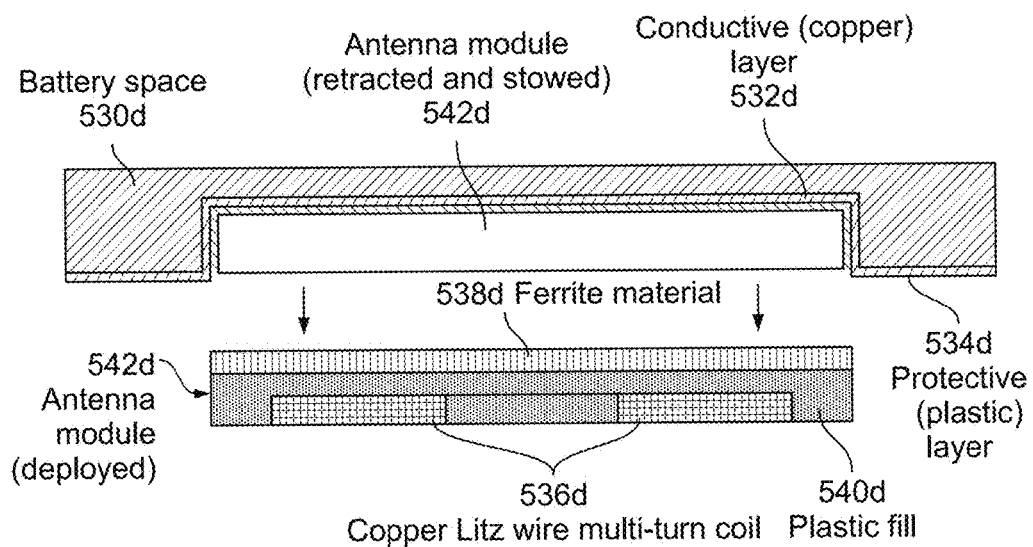

FIG. 5C illustrates another embodiment where the coil 536c (e.g., a copper Litz wire multi-turn coil) can be movable in a lateral ("X") direction. FIG. 5D illustrates another embodiment where the induction coil module is deployed in a downward direction. In some embodiments, the battery unit includes one of a deployable and non-deployable electric vehicle induction coil module 542d as part of the wireless power interface. To prevent magnetic fields from penetrating into the battery space 530d and into the interior of the vehicle, there can be a conductive layer shield 532d (e.g., a copper sheet) between the battery space 530d and the vehicle. Furthermore, a non-conductive (e.g., plastic) protective layer 534d can be used to protect the conductive layer shield 532d, the coil 536d, and the ferrite material 538d from environmental impacts (e.g., mechanical damage, oxidization, etc.). Furthermore, the coil 536d can be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542d is similar to that of FIG. 5B except there is no conductive shielding at the electric vehicle induction coil module 542d. The conductive shield 532d stays with the battery unit body. The protective layer 534d (e.g., plastic layer) is provided between the conductive shield 532d and the electric vehicle induction coil module 542d when the electric vehicle induction coil module 542d is not in a deployed state. The physical separation of the electric vehicle induction coil module 542d from the battery unit body can have a positive effect on the induction coil's performance.

As discussed above, the electric vehicle induction coil module 542d that is deployed can contain only the coil 536d (e.g., Litz wire) and ferrite material 538d. Ferrite backing can be provided to enhance coupling and to prevent from excessive eddy current losses in a vehicle's underbody or in the conductive layer shield 532d. Moreover, the electric vehicle induction coil module 542d can include a flexible wire connection to power conversion electronics and sensor electronics. This wire bundle can be integrated into the mechanical gear for deploying the electric vehicle induction coil module 542d.

With reference to FIG. 1, the charging systems described above can be used in a variety of locations for charging an electric vehicle 112, or transferring power back to a power grid. For example, the transfer of power can occur in a parking lot environment. It is noted that a "parking area" can also be referred to herein as a "parking space." To enhance the efficiency of a vehicle wireless power transfer system 100, an electric vehicle 112 can be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot can comprise a base wireless charging system 102a. Guidance systems (not shown) can be used to assist a vehicle operator in positioning an electric vehicle 112 in a parking area to align an electric vehicle induction coil 116 within the electric vehicle 112 with a base wireless charging system 102a. Guidance systems can include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 can be placed on the underside of the electric vehicle 112 for transmitting and receiving power from a base wireless charging system 102a. For example, an electric vehicle induction coil 116 can be integrated into the vehicles underbody preferably near a center position providing maximum safety distance in regards to EM exposure and permitting forward and reverse parking of the electric vehicle.

Figure 6:
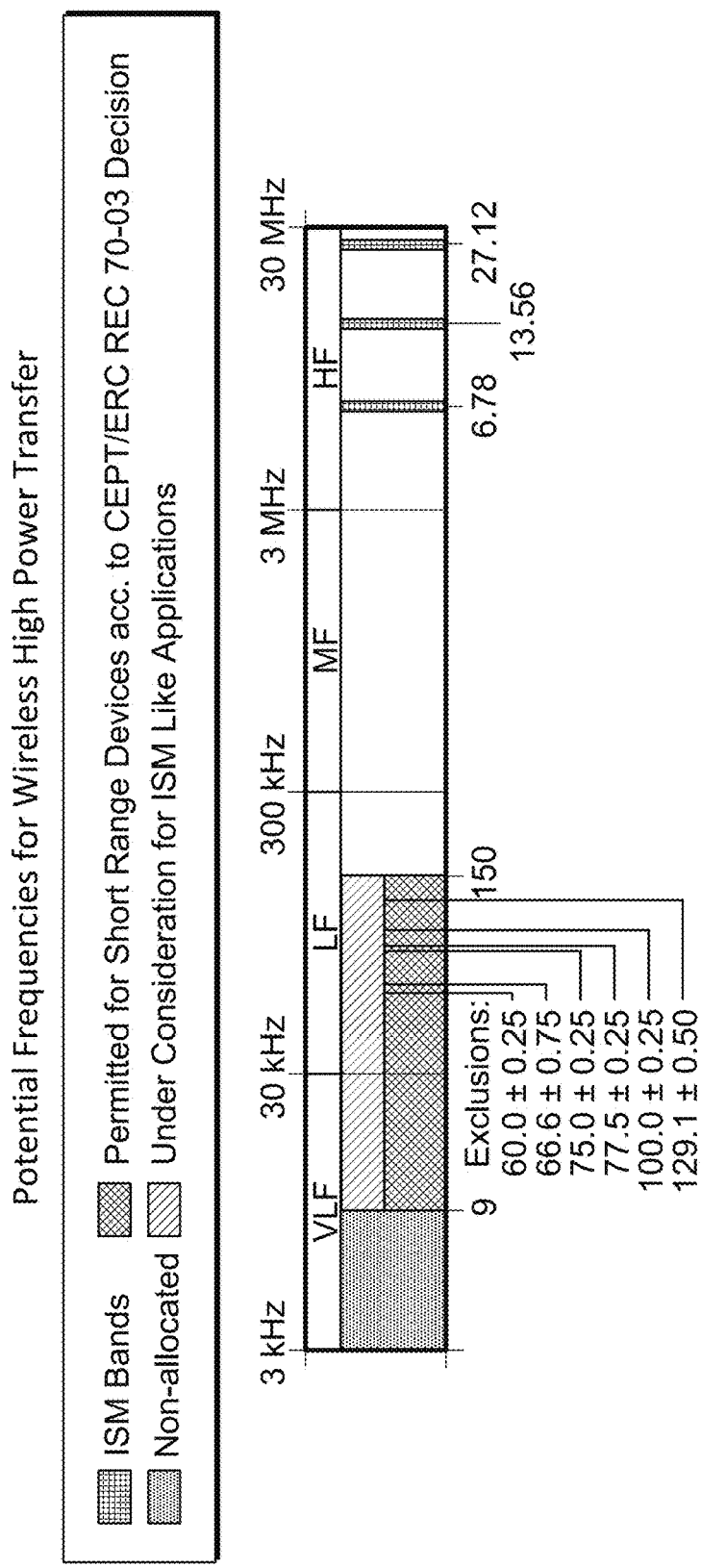
FIG. 6 is a chart of a frequency spectrum showing exemplary frequencies that can be used for wireless charging an electric vehicle, in accordance with an exemplary embodiment of the invention.

FIG. 6 is a chart of a frequency spectrum showing exemplary frequencies that can be used for wireless charging an electric vehicle, in accordance with an exemplary embodiment of the invention. As shown in FIG. 6, potential frequency ranges for wireless high power transfer to electric vehicles can include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
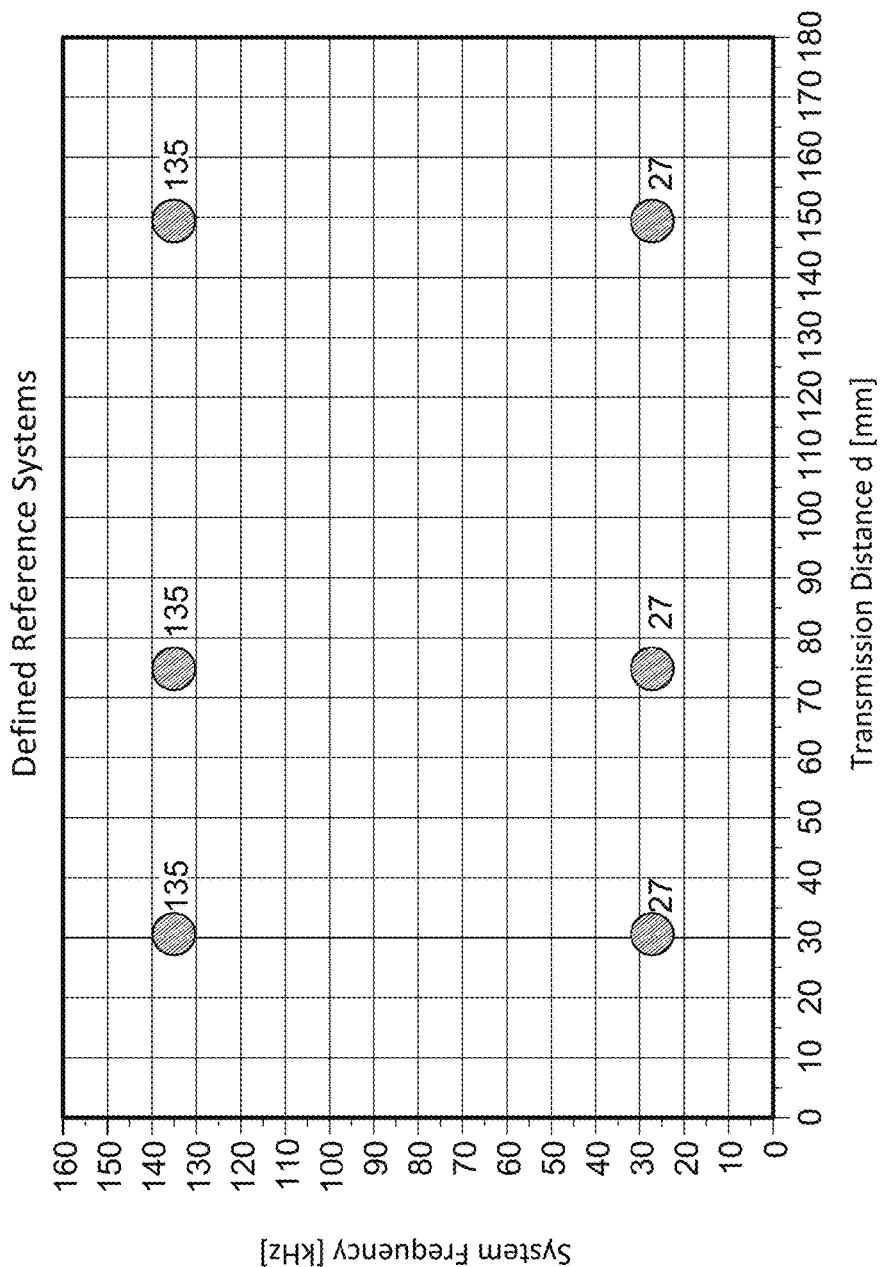
FIG. 7 is a chart showing exemplary frequencies and transmission distances that can be useful in wireless charging electric vehicles, in accordance with an exemplary embodiment of the invention.

FIG. 7 is a chart showing exemplary frequencies and transmission distances that can be useful in wireless charging electric vehicles, in accordance with an exemplary embodiment of the invention. Some example transmission distances that can be useful for electric vehicle wireless charging are about 30 mm, about 75 mm, and about 150 mm. Some exemplary frequencies can be about 27 kHz in the VLF band and about 135 kHz in the LF band.

During a charging cycle of an electric vehicle, a Base Charging Unit (BCU) of the wireless power transfer system can go through various states of operation. The wireless power transfer system can be referred to as a "charging system." The BCU can include the base wireless charging system 102a and/or 102b of FIG. 1. The BCU can also include a controller and/or a power conversion unit, such as power converter 236 as illustrated in FIG. 2. Further, the BCU can include one or more base charging pads that include an induction coil, such as induction coils 104a and 104b as illustrated in FIG. 1. As the BCU goes through the various states, the BCU interacts with a charging station. The charging station can include the local distribution center 130, as illustrated in FIG. 1, and can further include a controller, a graphical user interface, a communications module, and a network connection to a remote server or group of servers.

Figure 8:
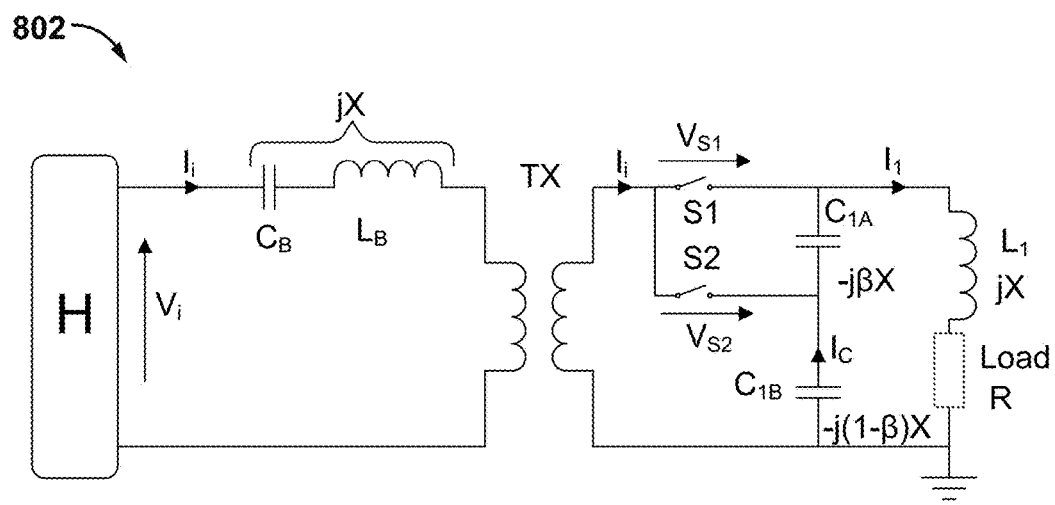
FIG. 8 is a schematic diagram of a base wireless charging system, according to one embodiment.

FIG. 8 is a schematic diagram of a base wireless charging system 802, according to one embodiment. In various embodiments, the base wireless charging system 802 can include, for example, any of the base wireless charging systems 102a, 102b, 202, and 302, described above with respect to FIGS. 1-3, respectively. As shown, the base wireless charging system 802 includes an inverter bridge H, a first capacitor $C_B$, a first inductor $L_B$, an isolation transformer TX, a first switch S1, a second switch S2, a second capacitor $C_{1A}$, a third capacitor $C_{1B}$, and a base system induction coil $L_1$. An effective load R represents a receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the fourth and fifth capacitors $C_{1A}$ and $C_{1B}$).

Although various portions of the wireless charging system 802 are shown in FIG. 8, a person having ordinary skill in the art will appreciate that one or more portions can be removed, replaced, or rearranged, or other portions can be included. For example, the single pole single throw (SPST) switches S1 and S2 can be replaced with a single pole double throw (SPDT) switch. Moreover, various capacitors, inductors, and/or resistors described herein can be replaced with equivalent circuits (for example, by integrating multiple components into a single component, splitting single components into multiple components, etc.).

The inverter bridge H serves to generate a time-varying signal for wireless power transmission. In various embodiments, the inverter bridge H can include, for example, circuitry such as an AC/DC converter configured to convert power from standard mains AC to DC power at a suitable voltage level, and a DC/low frequency (LF) converter configured to convert DC power to power at an operating frequency suitable for wireless high power transfer. In some embodiments, the inverter bridge H can include the base charging system power converter 236 and/or 336, discussed above with respect to FIGS. 2 and 3, respectively. The inverter bridge H shown in FIG. 8 provides an inverter output voltage $V_i$ and an inverter output current $I_i$. In the illustrated embodiment, the inverter bridge H includes at least a first terminal electrically coupled to a first terminal of the capacitor $C_B$, and a second terminal electrically coupled to a second terminal of a primary coil of the isolation transformer TX.

The first capacitor $C_B$ and the first inductor $L_B$ serve as a matching impedance jX. Together, the first capacitor $C_B$ and the first inductor $L_B$ can form a first inductive element of an LCL network turned for jX. In various embodiments, the capacitor $C_B$ and the first inductor $L_B$ can be replaced with another reactive network having the characteristic impedance jX. In the illustrated embodiment, the first capacitor $C_B$ includes at least a first terminal electrically coupled to the first terminal of the inverter bridge H and a second terminal electrically coupled to a first terminal of the first inductor $L_B$. In the illustrated embodiment, the first inductor $L_B$ includes at least a first terminal electrically coupled to the second terminal of the first capacitor $C_B$ and a second terminal electrically coupled to a first terminal of the primary coil of the isolation transformer TX.

The isolation transformer TX serves to electrically isolate the transmit base system induction coil $L_1$ from mains power. In some embodiments, the isolation transformer TX can propagate the inverter output current $I_i$ to the switches S1 and S2. In some embodiments, the isolation transformer TX can be omitted. In the illustrated embodiment, the isolation transformer TX has a turn ratio of 1:1. In other embodiments, the isolation transformer TX can have another turn ratio such as, for example, 1:n1.

In the illustrated embodiment, the isolation transformer TX includes a primary coil and a secondary coil. The primary coil includes at least a first terminal electrically coupled to the second terminal of the first inductor $L_B$ and a second terminal electrically coupled to the second terminal of the inverter bridge H. The secondary coil includes at least a first terminal electrically coupled to a first terminal of the first switch S1 and to a first terminal of the second switch S2, and a second terminal electrically coupled to a second terminal of the third capacitor $C_{1B}$ and to a second terminal of the base system induction coil $L_1$.

The capacitors $C_{1A}$ and $C_{1B}$ can be provided to form a resonant circuit with the base system induction coil $L_1$ that resonates at a desired frequency. In some embodiments, the capacitors $C_{1A}$ and $C_{1B}$ can form the capacitor $C_1$, described above with respect to FIG. 2. The second capacitor $C_{1A}$ has a characteristic impedance of $-j\beta X$, where $\beta$ is a tuning variation described in greater detail herein. The third capacitor $C_{1B}$ has a characteristic impedance of $-j(1-\beta)X$.

The second capacitor $C_{1A}$ includes at least a first terminal electrically coupled to a second terminal of the first switch S1 and to a first terminal of the base system induction coil $L_1$, and a second terminal electrically coupled to a second terminal of the second switch S2 and to a first terminal of the third capacitor $C_{1B}$. The second capacitor $C_{1A}$ can be dynamically set in one or at least two configurations, for example by operation of the switches S1 and S2. In a first configuration, also referred to as a parallel configuration, the second capacitor $C_{1A}$ is configured in parallel with the base system induction coil $L_1$ and in series with the third capacitor $C_{1B}$. In a second configuration, also referred to as a partial-series configuration, the second capacitor $C_{1A}$ is configured in series with the base system induction coil $L_1$ and in parallel with the third capacitor $C_{1B}$. The parallel configuration is shown and described herein with respect to FIGS. 9A-B and the partial-series configuration is shown and described herein with respect to FIGS. 10A-B.

The third capacitor $C_{1B}$ includes at least a first terminal electrically coupled to a second terminal of the second switch S2 and to the second terminal of the second capacitor $C_{1A}$, and a second terminal electrically coupled to the second terminal of the secondary coil of the isolation transformer TX and to the second terminal of the base system induction coil $L_1$. The third capacitor $C_{1B}$ is configured in parallel with the base system induction coil $L_1$. When the second capacitor $C_{1A}$ is set in the parallel configuration, the second capacitor $C_{1A}$ is configured in series with the third capacitor $C_{1B}$ and in parallel with the base system induction coil $L_1$. When the second capacitor $C_{1A}$ is set in the partial-series configuration, the second capacitor $C_{1A}$ is configured in parallel with the third capacitor $C_{1B}$ and in series with the base system induction coil $L_1$. The third capacitor $C_{1B}$ can carry a current $I_C$.

The first switch S1 serves to selectively couple first and second terminals. In conjunction with the second switch S2, the first switch S1 can set the second capacitor $C_{1A}$ in either the parallel or partial-series configuration. The first switch S1 can include, for example, a mechanical relay or semi-conductor alternating current (AC) switch. The first switch S1 includes a first terminal electrically coupled to the first terminal of the secondary coil of the isolation transformer TX and to the first terminal of the second switch S2, and a second terminal electrically coupled to the first terminal of the second capacitor $C_{1A}$ and to the first terminal of the base system induction coil $L_1$. The first switch S1 can carry the inverter output current $I_i$.

The second switch S2 serves to selectively couple first and second terminals. In conjunction with the first switch S1, the second switch S2 can set the second capacitor $C_{1A}$ in either the parallel or partial-series configuration. The second switch S2 can include, for example, a mechanical relay or semi-conductor alternating current (AC) switch. The second switch S2 includes a first terminal electrically coupled to the first terminal of the secondary coil of the isolation transformer TX and to the first terminal of the first switch S1, and a second terminal electrically coupled to the second terminal of the second capacitor $C_{1A}$ and to the first terminal of the third capacitor $C_{1B}$. The second switch S2 can carry the inverter output current $I_i$.

The base system induction coil $L_1$ serves to wirelessly transmit power at a level sufficient to charge or power the electric vehicle 112. For example, the power level provided wirelessly by the base system induction coil $L_1$ can be on the order of kilowatts (kW) (e.g., anywhere from 1 kW to 110 kW or higher or lower). In some embodiments, the base system induction coil $L_1$ can include the base system induction coil 204 described above with respect to FIG. 2. In other embodiments, the base system induction coil $L_1$ can serve other purposes, not limited to wireless or electric vehicle charging.

The base system induction coil $L_1$ can drive a receiver-side load, represented in FIG. 8 by the effective load R. The base system induction coil $L_1$ can carry a base system output current $I_1$, which can also be referred to as a resonant current $I_1$. In various embodiments, the base system output current $I_1$ can be a multiple of the inverter output current $I_i$ such as, for example, between around two and around six times the inverter output current $I_i$, around four times the inverter output current $I_i$, or around five times the inverter output current $I_i$. In various embodiments, the base system output current $I_1$ can be between around 30 A and around 50 A, such as around 40 A. Accordingly, the inverter output current $I_i$ can be between around 6 A and around 12 A, such as around 8 A, around 9 A, or around 10 A.

In various embodiments, the effective load R can vary over time. For example, the alignment of a receiving device (for example, the electric vehicle induction coil 216 of FIG. 2) can vary with respect to the base system induction coil $L_1$, causing magnetic coupling and output power variation. Accordingly, the base system output current $I_1$ can vary. However, the inverter output current $I_i$ is may be controlled and limited by four factors: a direct current (DC) bus voltage of the inverter bridge H, a maximum inverter output voltage an isolation transformer TX turns ratio, and a characteristic impedance of the LCL network in FIG. 8. In some embodiments, it can be infeasible and/or inefficient to adjust the first three factors. Particularly, the variation range of the DC bus can be limited to a device rating. Therefore, large variation β may force the base wireless charging system 802 to drift away from operating near an optimum or expected efficiency point. In some cases, the DC bus voltage may be fixed.

In some embodiments, the base wireless charging system 802 can be configured to introduce a step change of variation on the LCL network characteristic impedance using the AC switches S1 and S2. Particularly, as discussed above, the switches S1 and S2 can be configured to switch the second capacitor $C_{1A}$ between the partial-series configuration and the parallel configuration. The step change can reduce an amount of control at the inverter bridge H during operation. With a small incremental (10% to 30%) change on the LCL network impedance, the inverter bridge H and input power factor correction unit can maintain operation in a preferred region. For example, by switching between the partial-series configuration and the parallel configuration, the base system output current $I_1$ can be varied without changing the inverter output current $I_i$.

In one embodiment, the switches S1 and S2 can be opened and closed by a controller. For example, the base charging system controller 342 (FIG. 3) can be configured to switch the second capacitor $C_{1A}$ from the partial-series configuration to the parallel configuration and vice versa. In the parallel configuration, the base charging system controller 342 can close the first switch S1 and open the second switch S2. In the partial-series configuration, the base charging system controller 342 can open the first switch S1 and close the second switch S2. In some embodiments, the base charging system controller 342 does not simultaneously open the switches S1 and S2 or simultaneously close the switches S1 and S2. In other embodiments, the switches S1 and S2 are simultaneously opened and/or closed.

Figure 9A:
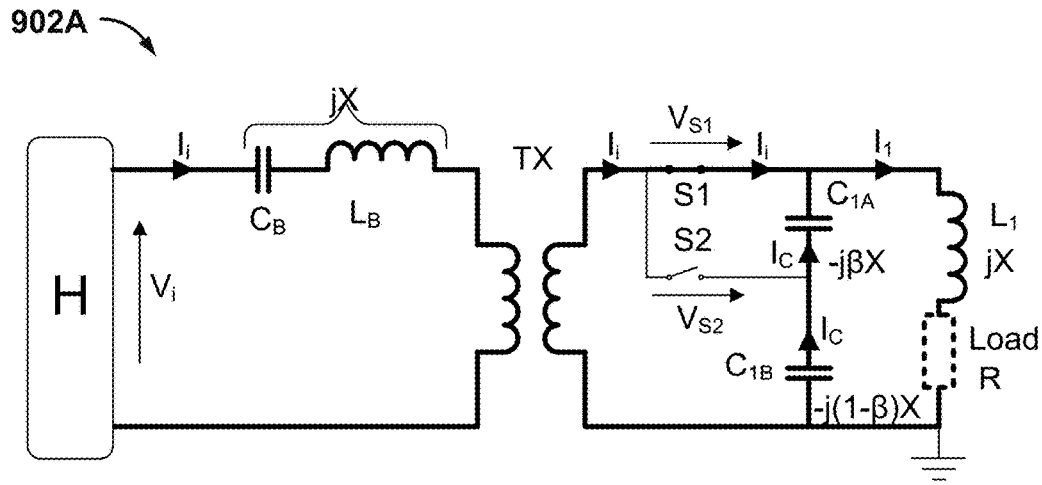
FIG. 9A is a schematic diagram of a base wireless charging system in a parallel configuration, according to one embodiment.

FIG. 9A is a schematic diagram of a base wireless charging system 902A in a parallel configuration, according to one embodiment. In various embodiments, the base wireless charging system 902A can include, for example, any of the base wireless charging systems 102a, 102b, 202, 302, and 802 described above with respect to FIGS. 1-3 and 8, respectively. As shown, the base wireless charging system 902A includes the inverter bridge H, the first capacitor $C_B$, the first inductor $L_B$, the isolation transformer TX, the first switch S1, the second switch S2, the second capacitor $C_{1A}$, the third capacitor $C_{1B}$, and the base system induction coil $L_1$. The effective load R represents the receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the second and third capacitors $C_{1A}$ and $C_{1B}$).

Although various portions of the wireless charging system 902A are shown in FIG. 9A, the person having ordinary skill in the art will appreciate that one or more portions can be removed, replaced, or rearranged, or other portions can be included. For example, the single pole single throw (SPST) switches S1 and S2 can be replaced with the single pole double throw (SPDT) switch. Moreover, various capacitors, inductors, and/or resistors described herein can be replaced with equivalent circuits (for example, by integrating multiple components into the single component, splitting single components into multiple components, etc.).

In the illustrated embodiment of FIG. 9A, the first switch S1 is closed and the second switch S2 is open. Accordingly, the second capacitor $C_{1A}$ is set in the parallel configuration. In other words, by shorting the first switch S1 and opening the second switch S2, the second capacitor $C_{1A}$, which has an impedance of $-j\beta X$, is configured in series with the third capacitor $C_{1B}$, which has an impedance of $-j(1-\beta)X$. Moreover, the second capacitor $C_{1A}$ and the third capacitor $C_{1B}$ are configured in parallel with the base system induction coil $L_1$, which has an impedance of jX, to form a parallel resonant network. In this configuration, the characteristic impedance of the LCL network is X. An equivalent circuit of this parallel compensation configuration is shown in FIG. 9B, below.

In the parallel configuration, the second capacitor C1A carries the current $I_C$. The first switch S1 carries the current $I_i$. The voltage stress across the second switch S2 while the first switch S1 is shorted is determined by Equation 1:

$$V_{S2}=I_C*\beta X \quad (1)$$

Figure 9B:
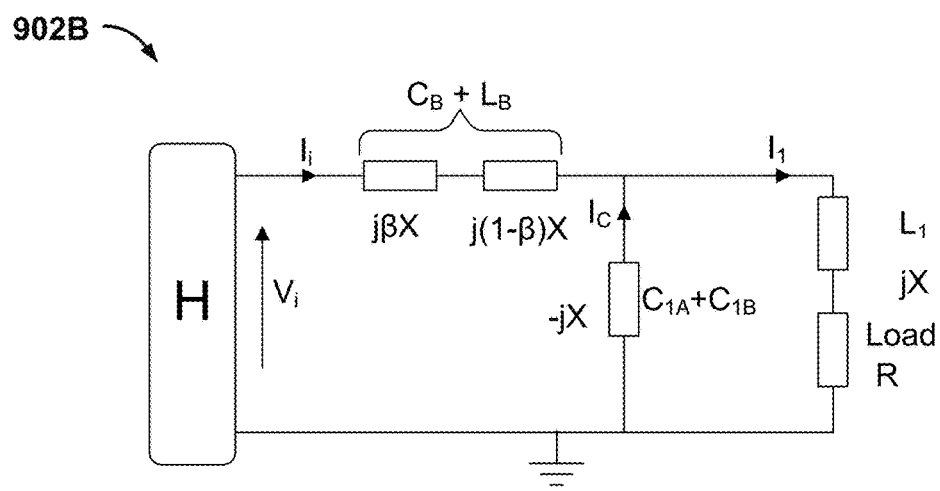
FIG. 9B is a schematic diagram of an equivalent circuit for a base wireless charging system in a parallel configuration, according to one embodiment.

FIG. 9B is a schematic diagram of an equivalent circuit 902B for a base wireless charging system in a parallel configuration, according to one embodiment. In an embodiment, the equivalent circuit 902B can include an equivalent for the base wireless charging system 902A, described above with respect to FIG. 9A. As shown, the equivalent circuit 902B includes the inverter bridge H, an equivalent capacitor $C_B$, an equivalent inductor $L_B$, an equivalent capacitor $C_{1A}+C_{1B}$, an equivalent inductor $L_1$, and the effective load R. The effective load R represents the receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the second and third capacitors $C_{1A}$ and $C_{1B}$). Although various portions of the wireless charging system 902B are shown in FIG. 9B, the person having ordinary skill in the art will appreciate that one or more portions can be removed, replaced, or rearranged, or other portions can be included.

Because the second capacitor $C_{1A}$ and the third capacitor $C_{1B}$ are in series, the equivalent capacitor $C_{1A}+C_{1B}$ has a characteristic impedance of $-jX$. The equivalent inductor $L_1$ has a characteristic impedance of jX, in resonance with the equivalent capacitor $C_{1A}+C_{1B}$. The matching equivalent capacitor $C_B$ and equivalent inductor $L_B$ also have a combined impedance of jX. Accordingly, the equivalent capacitor $C_B$ and equivalent inductor $L_B$ form the first inductor of an LCL network, the equivalent capacitor $C_{1A}+C_{1B}$ forms the capacitor of the LCL network, and the equivalent inductor $L_1$ and the effective load R form the second inductor of the LCL network.

Figure 10A:
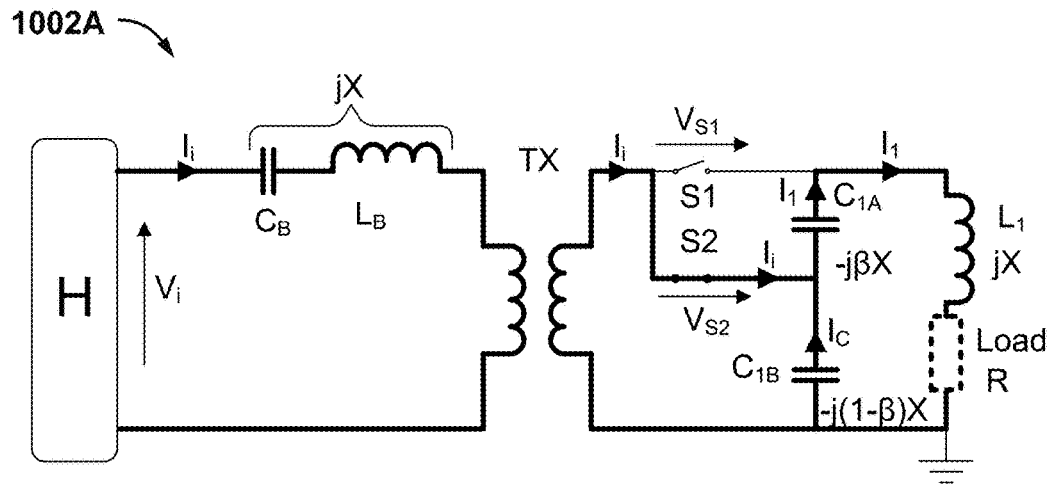
FIG. 10A is a schematic diagram of a base wireless charging system in a partial-series configuration, according to one embodiment.

FIG. 10A is a schematic diagram of a base wireless charging system 1002A in a partial-series configuration, according to one embodiment. In various embodiments, the base wireless charging system 1002A can include, for example, any of the base wireless charging systems 102a, 102b, 202, 302, and 802 described above with respect to FIGS. 1-3 and 8, respectively. As shown, the base wireless charging system 1002A includes the inverter bridge H, the first capacitor $C_B$, the first inductor $L_B$, the isolation transformer TX, the first switch S1, the second switch S2, the second capacitor $C_{1A}$, the third capacitor $C_{1B}$, and the base system induction coil $L_1$. The effective load R represents the receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the second and third capacitors $C_{1A}$ and $C_{1B}$).

Although various portions of the wireless charging system 1002A are shown in FIG. 10A, the person having ordinary skill in the art will appreciate that one or more portions can be removed, replaced, or rearranged, or other portions can be included. For example, the single pole single throw (SPST) switches S1 and S2 can be replaced with the single pole double throw (SPDT) switch. Moreover, various capacitors, inductors, and/or resistors described herein can be replaced with equivalent circuits (for example, by integrating multiple components into the single component, splitting single components into multiple components, etc.).

In the illustrated embodiment of FIG. 10A, the first switch S1 is open and the second switch S2 is closed. Accordingly, the second capacitor $C_{1A}$ is set in the partial-series configuration. In other words, by opening the first switch S1 and shorting the second switch S2, the second capacitor $C_{1A}$, which has an impedance of $-j\beta X$, is configured in series with the base system induction coil $L_1$, which has an impedance of jX. Moreover, the second capacitor $C_{1A}$ and the base system induction coil $L_1$ are configured in parallel with the third capacitor $C_{1B}$, which has an impedance of $-j(1-\beta)X$, to form a parallel resonant network. In this configuration, the characteristic impedance of the LCL network is $(1-\beta)X$. In other words, the base system output current $I_1$ is increased by a factor of $1/(1-\beta)$. An equivalent circuit of this parallel compensation configuration is shown in FIG. 10B, below.

In the partial-series configuration, the second capacitor C1A carries the current $I_1$. The second switch S2 carries the current $I_i$. The voltage stress across the first switch S1 while the second switch S2 is shorted is determined by Equation 2:

$$V_{S2}=I_1*\beta X \quad (2)$$

Figure 10B:
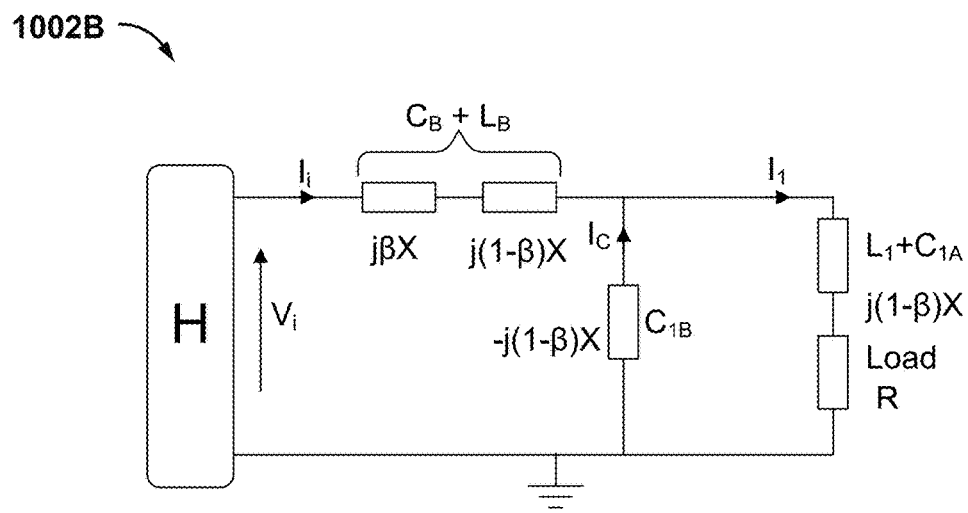
FIG. 10B is a schematic diagram of an equivalent circuit for a base wireless charging system in a partial-series configuration, according to one embodiment.

FIG. 10B is a schematic diagram of an equivalent circuit 1002B for a base wireless charging system in a partial-series configuration, according to one embodiment. In an embodiment, the equivalent circuit 1002B can include an equivalent for the base wireless charging system 1002A, described above with respect to FIG. 10A. As shown, the equivalent circuit 1002B includes the inverter bridge H, an equivalent capacitor $C_B$, an equivalent inductor $L_B$, an equivalent capacitor $C_{1B}$, an equivalent inductor $L_1+C_{1A}$, and the effective load R. The effective load R represents the receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the second and third capacitors $C_{1A}$ and $C_{1B}$). Although various portions of the wireless charging system 1002B are shown in FIG. 10B, the person having ordinary skill in the art will appreciate that one or more portions can be removed, replaced, or rearranged, or other portions can be included.

Because the second capacitor $C_{1A}$ and the base system induction coil $L_1$ are in series, the equivalent inductor $L_1+C_{1A}$ has a characteristic impedance of $j(1-\beta)X$. The equivalent capacitor $C_{1B}$ has a characteristic impedance of $-j(1-\beta)X$, in resonance with the equivalent inductor $L_1+C_{1A}$. Accordingly, the equivalent capacitor $C_B$ and equivalent inductor $L_B$ form the first inductor of an LCL network, the equivalent capacitor $C_{1B}$ forms the capacitor of the LCL network, and the equivalent inductor $L_1+C_{1A}$ and the effective load R form the second inductor of the LCL network.

Due to the change of LCL network characteristic impedance, the equivalent capacitor $C_B$ and equivalent inductor $L_B$ equivalently have an additional reactive component with an impedance value of $j\beta X$. This additional reactive component with value of $j\beta X$ can force the inverter bridge to supply an additional volt-ampere reactive (VAR). The ratio of this additional VAR over supplied power in respect to the tuning variation, $\beta$, and a loaded resonant Q of the LCL network is given in Equation 3:

$$\frac{VAR}{P} = \frac{-\beta R}{(1-\beta)^2 X} = \frac{-\beta}{(1-\beta)Q} \quad (3)$$

Because $VA^2=P^2+VAR^2$, for the same inverter output voltage $V_i$, the increase of inverter output current $I_i$ (considering only the fundamental component) can be expressed as shown in Equation 4:

$$\Delta I_i \propto \sqrt{1+\left(\frac{\beta}{(1-\beta)Q}\right)^2} \quad (4)$$

In some embodiments, the power supply resonant Q is kept equal or greater than 1. For example, with a variation $\beta$ of 0.5 and a Q of 1.5, for the same inverter output voltage $V_i$ the increase in magnitude for $I_i$ can be around 20%. A graph of the increase of $I_i$ versus the amount of mistuning $\beta$ is shown in FIG. 11.

Figure 11:
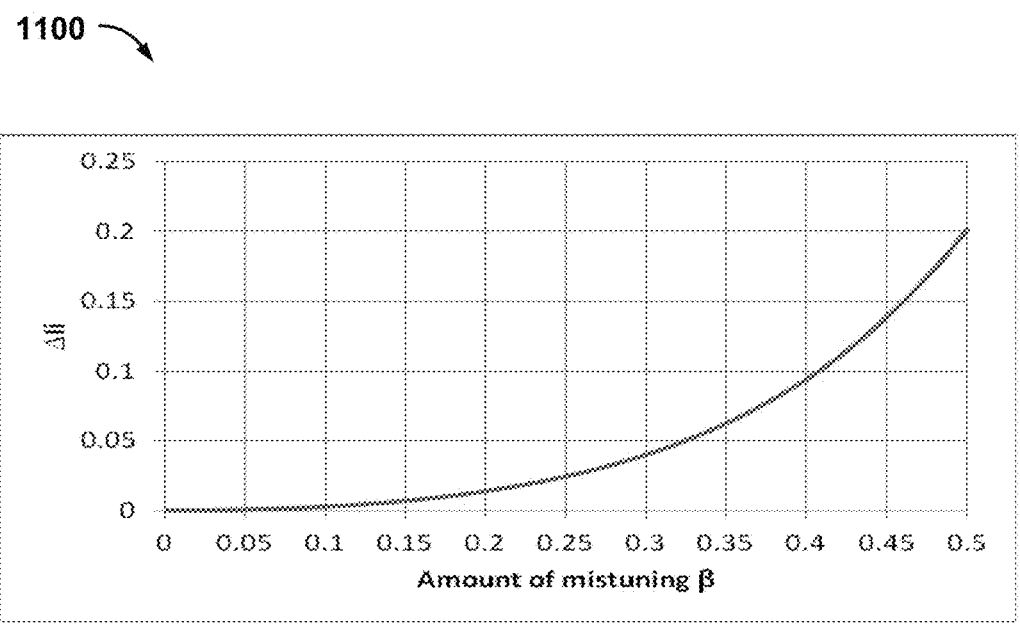
FIG. 11 is a chart showing an inverter output current versus an amount of mistuning.

FIG. 11 is a chart 1100 showing an inverter output current versus an amount of mistuning. The x-axis shows an amount of mistuning $\beta$ as described above with respect to FIGS. 8-10B. The y-axis shows the change in inverter output current $I_i$, discussed above with respect to FIGS. 8-10B. The chart 1100 assumes a stable maximum inverter output voltage $V_i$ and a loaded Q of 1.5.

Referring back to FIGS. 8-10, in some embodiments, the additional reactive loading $j\beta X$ can be compensated by the addition of one or more capacitors in series with the switches S1 and S2. For example, when each switch S1 and S2 is closed, the one or more capacitors can form the first branch of the LCL network with an impedance of jX to keep it tuned. In some embodiments, additional capacitors may not be needed to achieve a fully tuned LCL network in both operating states.

Figure 12A:
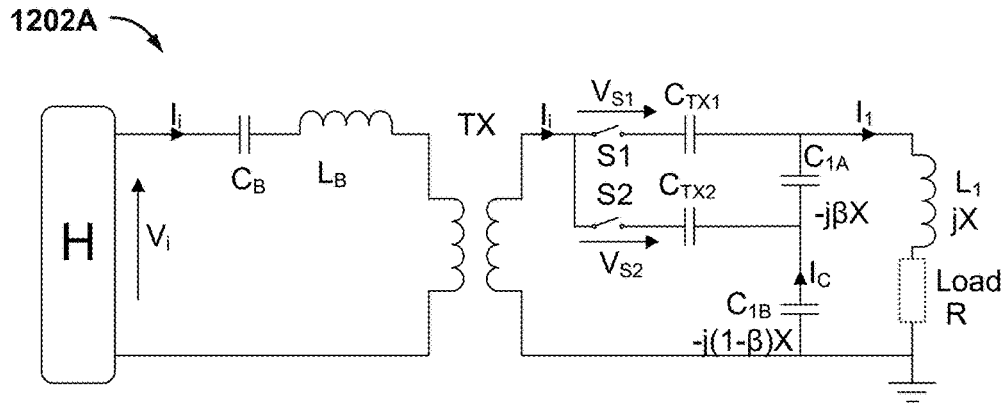
FIG. 12A is a schematic diagram of another base wireless charging system, according to one embodiment.

FIG. 12A is a schematic diagram of another base wireless charging system 1202, according to one embodiment. In various embodiments, the base wireless charging system 1202A can include, for example, any of the base wireless charging systems 102a, 102b, 202, and 302, described above with respect to FIGS. 1-3, respectively. As shown, the base wireless charging system 1202A includes the inverter bridge H, the first capacitor $C_B$, the first inductor $L_B$, the isolation transformer TX, the first switch S1, the second switch S2, the second capacitor $C_{1A}$, the third capacitor $C_{1B}$, a fourth capacitor $C_{TX1}$, a fifth capacitor $C_{TX2}$, and the base system induction coil $L_1$. An effective load R represents the receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the second and third capacitors $C_{1A}$ and $C_{1B}$).

Although various portions of the wireless charging system 1202A are shown in FIG. 12A, the person having ordinary skill in the art will appreciate that one or more portions can be removed, replaced, or rearranged, or other portions can be included. For example, the single pole single throw (SPST) switches S1 and S2 can be replaced with the single pole double throw (SPDT) switch. Moreover, various capacitors, inductors, and/or resistors described herein can be replaced with equivalent circuits (for example, by integrating multiple components into the single component, splitting single components into multiple components, etc.). For example, in some embodiments, the fourth capacitor $C_{TX2}$ can be replaced with a second inductor $L_{TX1}$ (not shown), depending on the polarity of the additional reactive component during switching $C_{1A}$ from the parallel configuration to the partial-series configuration and vice versa. As an example, in an embodiment where the total impedance of the first capacitor $C_B$ and the first inductor $L_B$ is $j(1-\beta)X$, during the parallel configuration, the second inductor $L_{TX1}$ can have an impedance of $j\beta X$ to keep the LCL network tuned. Then, during in the partial-series configuration, the fifth capacitor $C_{TX2}$ (or a third inductor $L_{TX2}$, not shown) can be omitted.

The inverter bridge H serves to generate the time-varying signal for wireless power transmission. In various embodiments, the inverter bridge H can include, for example, circuitry such as the AC/DC converter configured to convert power from standard mains AC to DC power at the suitable voltage level, and the DC/low frequency (LF) converter configured to convert DC power to power at the operating frequency suitable for wireless high power transfer. In some embodiments, the inverter bridge H can include the base charging system power converter 236 and/or 336, discussed above with respect to FIGS. 2 and 3, respectively. The inverter bridge H shown in FIG. 12A provides the inverter output voltage $V_i$ and the inverter output current $I_i$. In the illustrated embodiment, the inverter bridge H includes at least the first terminal electrically coupled to the first terminal of the capacitor $C_B$, and the second terminal electrically coupled to the second terminal of the primary coil of the isolation transformer TX.

The first capacitor $C_B$ and the first inductor $L_B$ serve as the matching impedance jX. Together, the first capacitor $C_B$ and the first inductor $L_B$ can form the first inductive element of the LCL network turned for jX. In various embodiments, the capacitor $C_B$ and the first inductor $L_B$ can be replaced with another reactive network having the characteristic impedance jX. In the illustrated embodiment, the first capacitor $C_B$ includes at least the first terminal electrically coupled to the first terminal of the inverter bridge H and the second terminal electrically coupled to the first terminal of the first inductor $L_B$. In the illustrated embodiment, the first inductor $L_B$ includes at least the first terminal electrically coupled to the second terminal of the first capacitor $C_B$ and the second terminal electrically coupled to the first terminal of the primary coil of the isolation transformer TX.

The isolation transformer TX serves to electrically isolate the transmit base system induction coil $L_1$ from mains power. In some embodiments, the isolation transformer TX can propagate the inverter output current $I_i$ to the switches S1 and S2. In some embodiments, the isolation transformer TX can be omitted. In the illustrated embodiment, the isolation transformer TX has the turn ratio of 1:1. In other embodiments, the isolation transformer TX can have another turn ratio such as, for example, 1:n1.

In the illustrated embodiment, the isolation transformer TX includes the primary coil and the secondary coil. The primary coil includes at least the first terminal electrically coupled to the second terminal of the first inductor $L_B$ and the second terminal electrically coupled to the second terminal of the inverter bridge H. The secondary coil includes at least the first terminal electrically coupled to the first terminal of the first switch S1 and to the first terminal of the second switch S2, and the second terminal electrically coupled to the second terminal of the third capacitor $C_{1B}$ and to the second terminal of the base system induction coil $L_1$.

The capacitors $C_{1A}$ and $C_{1B}$ can be provided to form the resonant circuit with the base system induction coil $L_1$ that resonates at the desired frequency. In some embodiments, the capacitors $C_{1A}$ and $C_{1B}$ can form the capacitor $C_1$, described above with respect to FIG. 2. The second capacitor $C_{1A}$ has the characteristic impedance of $-j\beta X$, where $\beta$ is the tuning variation described in greater detail herein. The third capacitor $C_{1B}$ has the characteristic impedance of $-j(1-\beta)X$.

The second capacitor $C_{1A}$ includes at least the first terminal electrically coupled to a second terminal of the fourth capacitor $C_{TX1}$ and to the first terminal of the base system induction coil $L_1$, and the second terminal electrically coupled to a second terminal of the fifth capacitor $C_{TX2}$ and to the first terminal of the third capacitor $C_{1B}$. The second capacitor $C_{1A}$ can be dynamically set in one or at least two configurations, for example by operation of the switches S1 and S2. In the first configuration, also referred to as the parallel configuration, the second capacitor $C_{1A}$ is configured in parallel with the base system induction coil $L_1$ and in series with the third capacitor $C_{1B}$. In the second configuration, also referred to as the partial-series configuration, the second capacitor $C_{1A}$ is configured in series with the base system induction coil $L_1$ and in parallel with the third capacitor $C_{1B}$.

The third capacitor $C_{1B}$ includes at least the first terminal electrically coupled to the second terminal of the fifth capacitor $C_{TX2}$ and to the second terminal of the second capacitor $C_{1A}$, and the second terminal electrically coupled to the second terminal of the secondary coil of the isolation transformer TX and to the second terminal of the base system induction coil $L_1$. The third capacitor $C_{1B}$ is configured in parallel with the base system induction coil $L_1$. When the second capacitor $C_{1A}$ is set in the parallel configuration, the second capacitor $C_{1A}$ is configured in series with the third capacitor $C_{1B}$ and in parallel with the base system induction coil $L_1$. When the second capacitor $C_{1A}$ is set in the partial-series configuration, the second capacitor $C_{1A}$ is configured in parallel with the third capacitor $C_{1B}$ and in series with the base system induction coil $L_1$. The third capacitor $C_{1B}$ can carry the current $I_C$.

The first switch S1 serves to selectively couple first and second terminals. In conjunction with the second switch S2, the first switch S1 can set the second capacitor $C_{1A}$ in either the parallel or partial-series configuration. The first switch S1 can include, for example, the mechanical relay or semiconductor alternating current (AC) switch. The first switch S1 includes the first terminal electrically coupled to the first terminal of the secondary coil of the isolation transformer TX and to the first terminal of the second switch S2, and the second terminal electrically coupled to the first terminal of the fourth capacitor $C_{TX1}$. The first switch S1 can carry the inverter output current $I_i$.

The second switch S2 serves to selectively couple first and second terminals. In conjunction with the first switch S1, the second switch S2 can set the second capacitor $C_{1A}$ in either the parallel or partial-series configuration. The second switch S2 can include, for example, the mechanical relay or semi-conductor alternating current (AC) switch. The second switch S2 includes the first terminal electrically coupled to the first terminal of the secondary coil of the isolation transformer TX and to the first terminal of the first switch S1, and the second terminal electrically coupled to the first terminal of the fifth capacitor $C_{TX2}$. The second switch S2 can carry the inverter output current $I_i$.

The base system induction coil $L_1$ serves to wirelessly transmit power at the level sufficient to charge or power the electric vehicle 112. For example, the power level provided wirelessly by the base system induction coil $L_1$ can be on the order of kilowatts (kW) (e.g., anywhere from 1 kW to 110 kW or higher or lower). In some embodiments, the base system induction coil $L_1$ can include the base system induction coil 204 described above with respect to FIG. 2. In other embodiments, the base system induction coil $L_1$ can serve other purposes, not limited to wireless or electric vehicle charging.

The base system induction coil $L_1$ can drive the receiver-side load, represented in FIG. 12A by the effective load R. The base system induction coil $L_1$ can carry the base system output current $I_1$, which can also be referred to as the resonant current $I_1$. In various embodiments, the base system output current $I_1$ can be the multiple of the inverter output current $I_i$ such as, for example, between around two and around six times the inverter output current $I_i$, around four times the inverter output current $I_i$, or around five times the inverter output current $I_i$. In various embodiments, the base system output current $I_1$ can be between around 30 A and around 50 A, such as around 40 A. Accordingly, the inverter output current $I_i$ can be between around 6 A and around 12 A, such as around 8 A, around 9 A, or around 10 A.

The fourth capacitor $C_{TX1}$ serves to form a first branch of an LCL network, along with the first capacitor $C_B$ and the first inductor $L_B$, when the first switch S1 is closed. In other words, the fourth capacitor $C_{TX1}$ can tune the base wireless charging system 1202A when in the parallel configuration. In an embodiment, the fourth capacitor $C_{TX1}$ can be omitted.

The fifth capacitor $C_{TX2}$ serves to form a first branch of an LCL network, along with the first capacitor $C_B$ and the first inductor $L_B$, when the second switch S2 is closed. In other words, the fifth capacitor $C_{TX2}$ can tune the base wireless charging system 1202A when in the partial-series configuration. The total impedance of the fourth capacitor $C_{1B}$, in conjunction with the first capacitor $C_B$ and the first inductor $L_B$, can be jX. The total impedance of the fifth capacitor $C_{TX2}$, in conjunction with the first capacitor $C_B$ and the first inductor $L_B$, can be $j(1-\beta)X$. Equivalent circuits for parallel and partial-series configurations are shown in FIGS. 12B-12C, below.

Figure 12B:
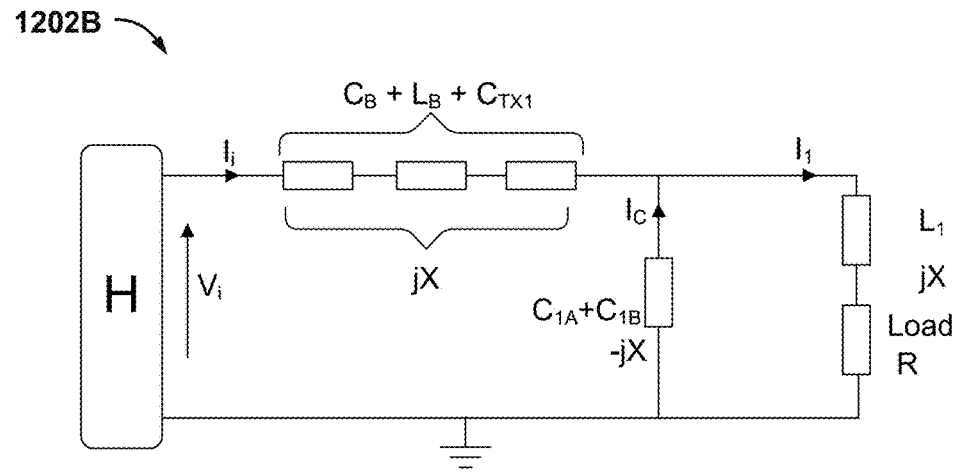
FIG. 12B is a schematic diagram of an equivalent circuit for a base wireless charging system in a parallel configuration, according to one embodiment.

FIG. 12B is a schematic diagram of an equivalent circuit 1202B for a base wireless charging system in a parallel configuration, according to one embodiment. In an embodiment, the equivalent circuit 1202B can include an equivalent for the base wireless charging system 902A, described above with respect to FIG. 9A. As shown, the equivalent circuit 1202B includes the inverter bridge H, an equivalent capacitor $C_B$, an equivalent inductor $L_B$, an equivalent capacitor $C_{TX1}$, an equivalent capacitor $C_{1A}+C_{1B}$, an equivalent inductor $L_1$, and the effective load R. The effective load R represents the receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the fourth and fifth capacitors $C_{1A}$ and $C_{1B}$). Although various portions of the wireless charging system 1202B are shown in FIG. 12B, the person having ordinary skill in the art will appreciate that one or more portions can be removed, replaced, or rearranged, or other portions can be included.

Because the second capacitor $C_{1A}$ and the third capacitor $C_{1B}$ are in series, the equivalent capacitor $C_{1A}+C_{1B}$ has a characteristic impedance of $-jX$. The equivalent inductor $L_1$ has a characteristic impedance of jX, in resonance with the equivalent capacitor $C_{1B}+C_{1B}$. The equivalent capacitor $C_B$, equivalent inductor $L_B$, and equivalent capacitor $C_{TX1}$ have a combined impedance of jX. Accordingly, the equivalent capacitor $C_B$, the equivalent inductor $L_B$, and the equivalent capacitor $C_{1B}$ form the first inductor of an LCL network, the equivalent capacitor $C_{1A}$–$C_{1B}$ forms the capacitor of the LCL network, and the equivalent inductor $L_1$ and the effective load R form the second inductor of the LCL network.

Figure 12C:
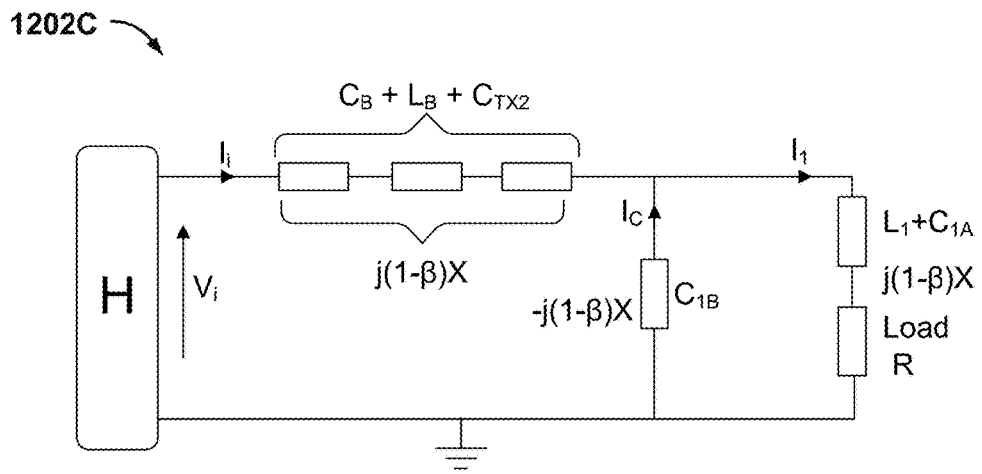
FIG. 12C is a schematic diagram of an equivalent circuit for a base wireless charging system in a partial-series configuration, according to one embodiment.

FIG. 12C is a schematic diagram of an equivalent circuit 1202C for a base wireless charging system in a partial-series configuration, according to one embodiment. In an embodiment, the equivalent circuit 1202C can include an equivalent for the base wireless charging system 1002A, described above with respect to FIG. 10A. As shown, the equivalent circuit 1202C includes the inverter bridge H, an equivalent capacitor $C_B$, an equivalent inductor $L_B$, an equivalent capacitor $C_{TX2}$, an equivalent capacitor $C_{1B}$, an equivalent inductor $L_1+C_{1A}$, and the effective load R. The effective load R represents the receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the fourth and fifth capacitors $C_{1A}$ and $C_{1B}$). Although various portions of the wireless charging system 1202C are shown in FIG. 12C, the person having ordinary skill in the art will appreciate that one or more portions can be removed, replaced, or rearranged, or other portions can be included.

Because the second capacitor $C_{1A}$ and the base system induction coil $L_1$ are in series, the equivalent inductor $L_1+C_{1A}$ has a characteristic impedance of $j(1-\beta)X$. The equivalent capacitor $C_{1B}$ has a characteristic impedance of $-j(1-\beta)X$, in resonance with the equivalent inductor $L_1+C_{1A}$. The equivalent capacitor $C_B$, equivalent inductor $L_B$, and equivalent capacitor $C_{TX2}$ have a matching combined impedance of $j(1-\beta)X$. Accordingly, the equivalent capacitor $C_B$, equivalent inductor $L_B$, and equivalent capacitor $C_{TX2}$ form the first inductor of an LCL network, the equivalent capacitor $C_{1B}$ forms the capacitor of the LCL network, and the equivalent inductor $L_1+C_{1A}$ and the effective load R form the second inductor of the LCL network.

Figure 14:
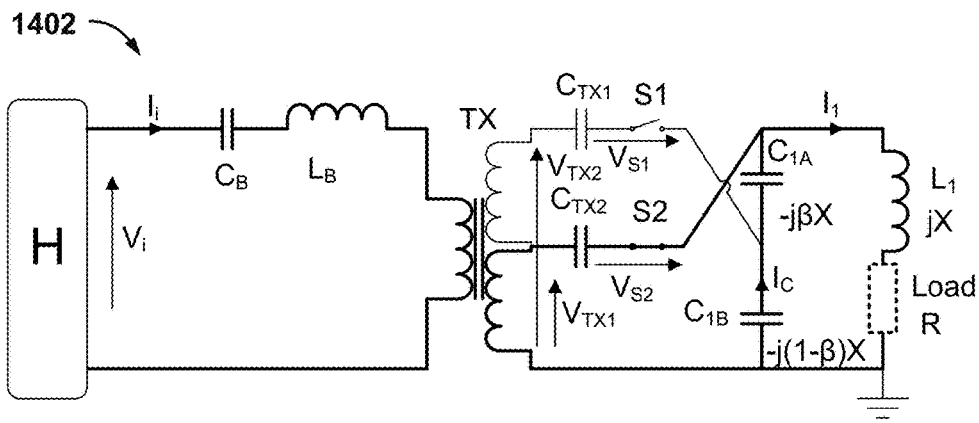
FIG. 14 is a schematic diagram of a base wireless charging system having a multi-tap transformer in a parallel configuration, according to one embodiment.
Figure 15:
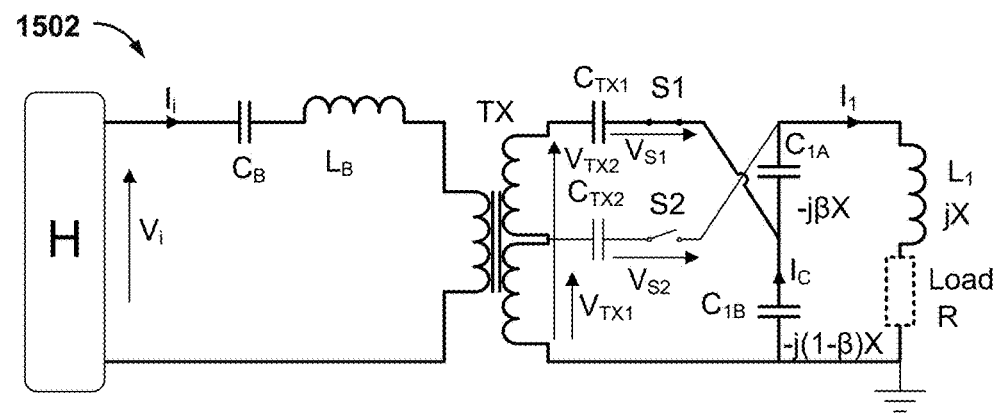
FIG. 15 is a schematic diagram of a base wireless charging system having a multi-tap transformer in a partial-series configuration, according to one embodiment.

In an embodiment, a base wireless charging system can also adjust a transformer turns ratio while concurrently changing the characteristic impedance of the LCL network. Accordingly, a controller can adjust a ratio between $I_1$ and $V_i$ based on a detected magnetic coupling variation and loading requirements. One embodiment of a primary power supply having a multiple secondary tap transformer is shown in FIGS. 13-15.

Figure 13:
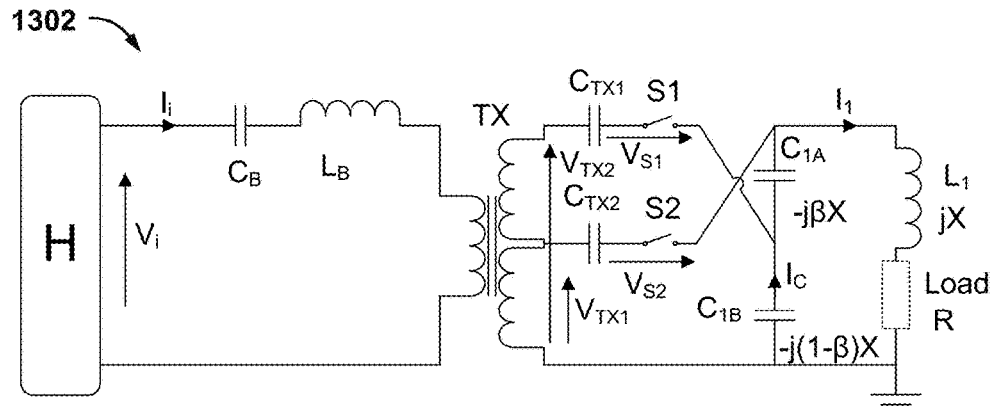
FIG. 13 is a schematic diagram of another base wireless charging system having a multi-tap transformer, according to one embodiment.

FIG. 13 is a schematic diagram of another base wireless charging system 1302 having a multi-tap transformer, according to one embodiment. In various embodiments, the base wireless charging system 1302 can include, for example, any of the base wireless charging systems 102a, 102b, 202, and 302, described above with respect to FIGS. 1-3, respectively. As shown, the base wireless charging system 1302 includes an inverter bridge H, a first capacitor $C_B$, a first inductor $L_B$, a multi-tap transformer TX, a first switch S1, a second switch S2, a second capacitor $C_{1A}$, a third capacitor $C_{1B}$, a fourth capacitor $C_{1B}$, a fifth capacitor $C_{TX2}$, and a base system induction coil $L_1$. An effective load R represents a receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the second and third capacitors $C_{1A}$ and $C_{1B}$).

Although various portions of the wireless charging system 1302 are shown in FIG. 13, a person having ordinary skill in the art will appreciate that one or more portions can be removed, replaced, or rearranged, or other portions can be included. Moreover, various capacitors, inductors, and/or resistors described herein can be replaced with equivalent circuits (for example, by integrating multiple components into a single component, splitting single components into multiple components, etc.).

The inverter bridge H serves to generate a time-varying signal for wireless power transmission. In various embodiments, the inverter bridge H can include, for example, circuitry such as an AC/DC converter configured to convert power from standard mains AC to DC power at a suitable voltage level, and a DC/low frequency (LF) converter configured to convert DC power to power at an operating frequency suitable for wireless high power transfer. In some embodiments, the inverter bridge H can include the base charging system power converter 236 and/or 336, discussed above with respect to FIGS. 2 and 3, respectively. The inverter bridge H shown in FIG. 13 provides an inverter output voltage $V_i$, and an inverter output current $I_i$. In the illustrated embodiment, the inverter bridge H includes at least a first terminal electrically coupled to a first terminal of the capacitor $C_B$, and a second terminal electrically coupled to a second terminal of a primary coil of the multi-tap transformer TX.

The first capacitor $C_B$ and the first inductor $L_B$ serve as a matching impedance jX. Together, the first capacitor $C_B$ and the first inductor $L_B$ can form a first inductive element of an LCL network turned for jX. In various embodiments, the capacitor $C_B$ and the first inductor $L_B$ can be replaced with another reactive network having the characteristic impedance jX. In the illustrated embodiment, the first capacitor $C_B$ includes at least a first terminal electrically coupled to the first terminal of the inverter bridge H and a second terminal electrically coupled to a first terminal of the first inductor $L_B$. In the illustrated embodiment, the first inductor $L_B$ includes at least a first terminal electrically coupled to the second terminal of the first capacitor $C_B$ and a second terminal electrically coupled to a first terminal of the primary coil of the multi-tap transformer TX.

The multi-tap transformer TX serves to electrically isolate the transmit base system induction coil $L_1$ from mains power. In some embodiments, the multi-tap transformer TX can propagate the inverter output current $I_i$ to the switches S1 and S2. In some embodiments, the multi-tap transformer TX can be omitted. In the illustrated embodiment, the multi-tap transformer TX has a selectable turn ratio based on a tap output. The selectable turn ratio can be, for example, 1:1, 2:1, etc. In other embodiments, the multi-tap transformer TX can have other turn ratios such as, for example, 1:n1.

In the illustrated embodiment, the multi-tap transformer TX includes a primary coil and a secondary coil. The primary coil includes at least a first terminal electrically coupled to the second terminal of the first inductor $L_B$ and a second terminal electrically coupled to the second terminal of the inverter bridge H. The secondary coil includes at least a first terminal electrically coupled to a first terminal of the fourth capacitor $C_{TX1}$, a second terminal electrically coupled to a first terminal of the fifth capacitor $C_{TX2}$, and a third terminal electrically coupled to a second terminal of the third capacitor $C_{1B}$ and to a second terminal of the base system induction coil $L_1$. An output voltage at the first terminal of the secondary coil is $V_{TX1}$ and an output voltage at the second terminal of the secondary coil is $V_{TX2}$, which can be a fraction of $V_{TX1}$.

The capacitors $C_{1A}$ and $C_{1B}$ can be provided to form a resonant circuit with the base system induction coil $L_1$ that resonates at a desired frequency. In some embodiments, the capacitors $C_{1A}$ and $C_{1B}$ can form the capacitor $C_1$, described above with respect to FIG. 2. The second capacitor $C_{1A}$ has a characteristic impedance of $-j\beta X$, where $\beta$ is a tuning variation described in greater detail herein. The third capacitor $C_{1B}$ has a characteristic impedance of $-j(1-\beta)X$.

The second capacitor $C_{1A}$ includes at least a first terminal electrically coupled to a second terminal of the second switch S2 and to a first terminal of the base system induction coil $L_1$, and a second terminal electrically coupled to a second terminal of the first switch S1 and to a first terminal of the third capacitor $C_{1B}$. The second capacitor $C_{1A}$ can be dynamically set in one or at least two configurations, for example by operation of the switches S1 and S2. In a first configuration, also referred to as a parallel configuration, the second capacitor $C_{1A}$ is configured in parallel with the base system induction coil $L_1$ and in series with the third capacitor $C_{1B}$. In the parallel configuration, the second capacitor $C_{1A}$ can receive the second tap voltage $V_{TX2}$, which can have a lower absolute value than the first tap voltage $V_{TX1}$. In a second configuration, also referred to as a partial-series configuration, the second capacitor $C_{1A}$ is configured in series with the base system induction coil $L_1$ and in parallel with the third capacitor $C_{1B}$. In the parallel configuration, the second capacitor $C_{1A}$ can receive the first tap voltage $V_{TX1}$, which can have a higher absolute value than the second tap voltage $V_{TX2}$. The parallel configuration is shown and described herein with respect to FIG. 14 and the partial-series configuration is shown and described herein with respect to FIG. 15.

The third capacitor $C_{1B}$ includes at least a first terminal electrically coupled to a second terminal of the first switch S1 and to the second terminal of the second capacitor $C_{1A}$, and a second terminal electrically coupled to the second terminal of the secondary coil of the multi-tap transformer TX and to the second terminal of the base system induction coil $L_1$. The third capacitor $C_{1B}$ is configured in parallel with the base system induction coil $L_1$. When the second capacitor $C_{1A}$ is set in the parallel configuration, the second capacitor $C_{1A}$ is configured in series with the third capacitor $C_{1B}$ and in parallel with the base system induction coil $L_1$. When the second capacitor $C_{1A}$ is set in the partial-series configuration, the second capacitor $C_{1A}$ is configured in parallel with the third capacitor $C_{1B}$ and in series with the base system induction coil $L_1$. The third capacitor $C_{1B}$ can carry a current $I_C$.

The first switch S1 serves to selectively couple first and second terminals. In conjunction with the second switch S2, the first switch S1 can set the second capacitor $C_{1A}$ in either the parallel or partial-series configuration. The first switch S1 can include, for example, a mechanical relay or semi-conductor alternating current (AC) switch. The first switch S1 includes a first terminal electrically coupled to the first terminal of the secondary coil of the multi-tap transformer TX (via a second terminal of the fourth capacitor $C_{TX1}$), and a second terminal electrically coupled to the second terminal of the second capacitor $C_{1A}$ and to the first terminal of the third capacitor $C_{1B}$. The first switch S1 can carry the inverter output current $I_i$.

The second switch S2 serves to selectively couple first and second terminals. In conjunction with the first switch S1, the second switch S2 can set the second capacitor $C_{1A}$ in either the parallel or partial-series configuration. The second switch S2 can include, for example, a mechanical relay or semi-conductor alternating current (AC) switch. The second switch S2 includes a first terminal electrically coupled to the second terminal of the secondary coil of the multi-tap transformer TX (via a second terminal of the fifth capacitor $C_{TX2}$), and a second terminal electrically coupled to the first terminal of the second capacitor $C_{1A}$ and to the first terminal of the base system induction coil $L_1$. The second switch S2 can carry the inverter output current $I_i$.

The base system induction coil $L_1$ serves to wirelessly transmit power at a level sufficient to charge or power the electric vehicle 112. For example, the power level provided wirelessly by the base system induction coil $L_1$ can be on the order of kilowatts (kW) (e.g., anywhere from 1 kW to 110 kW or higher or lower). In some embodiments, the base system induction coil $L_1$ can include the base system induction coil 204 described above with respect to FIG. 2. In other embodiments, the base system induction coil $L_1$ can serve other purposes, not limited to wireless or electric vehicle charging.

The base system induction coil $L_1$ can drive a receiver-side load, represented in FIG. 13 by the effective load R. The base system induction coil $L_1$ can carry a base system output current $I_1$, which can also be referred to as a resonant current $I_1$. In various embodiments, the base system output current $I_1$ can be a multiple of the inverter output current $I_i$ such as, for example, between around two and around six times the inverter output current $I_i$, around four times the inverter output current $I_i$, or around five times the inverter output current $I_i$. In various embodiments, the base system output current $I_1$ can be between around 30 A and around 50 A, such as around 40 A. Accordingly, the inverter output current $I_i$ can be between around 6 A and around 12 A, such as around 8 A, around 9 A, or around 10 A.

The fourth capacitor $C_{1B}$ serves to form a first branch of an LCL network, along with the first capacitor $C_B$ and the first inductor $L_B$, when the first switch S1 is closed. In other words, the fourth capacitor $C_{1B}$ can tune the base wireless charging system 1202 when in the partial-series configuration. The fifth capacitor $C_{TX2}$ serves to form a first branch of an LCL network, along with the first capacitor $C_B$ and the first inductor $L_B$, when the second switch S2 is closed. In other words, the fifth capacitor $C_{TX2}$ can tune the base wireless charging system 1202 when in the parallel configuration. In an embodiment, the fifth capacitor $C_{TX2}$ can be omitted When the second switch S2 is closed, the multi-tap transformer TX can operate in a low turns-ratio state and the LCL network can operate in a relatively higher impedance state jX, as shown and described below with respect to FIG. 14. A lower voltage $V_{TX1}$ and a higher impedance will result in a lower current $I_1$ in the base system induction coil $L_1$. When the first switch S1 is closed, the multi-tap transformer TX can operate in a high turns-ratio state and the LCL network can operate in a relatively lower impedance state $j(1-\beta)X$, as shown and described below with respect to FIG. 15. Therefore, a higher voltage $V_{TX2}$ and a lower impedance will result in a higher current $I_1$ in the base system induction coil $L_1$.

FIG. 14 is a schematic diagram of a base wireless charging system 1402 having a multi-tap transformer in a parallel configuration, according to one embodiment. In various embodiments, the base wireless charging system 1402 can include, for example, any of the base wireless charging systems 102a, 102b, 202, 302, and 1302 described above with respect to FIGS. 1-3 and 8, respectively. As shown, the base wireless charging system 1402 includes the inverter bridge H, the first capacitor $C_B$, the first inductor $L_B$, the multi-tap transformer TX, the first switch S1, the second switch S2, the second capacitor $C_{1A}$, the third capacitor $C_{1B}$, the fourth capacitor $C_{TX1}$, the fifth capacitor $C_{TX2}$, and the base system induction coil $L_1$. The effective load R represents the receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the second and third capacitors $C_{1A}$ and $C_{1B}$).

Although various portions of the wireless charging system 1402 are shown in FIG. 14, the person having ordinary skill in the art will appreciate that one or more portions can be removed, replaced, or rearranged, or other portions can be included. Moreover, various capacitors, inductors, and/or resistors described herein can be replaced with equivalent circuits (for example, by integrating multiple components into the single component, splitting single components into multiple components, etc.).

In the illustrated embodiment of FIG. 14, the first switch S1 is open and the second switch S2 is closed. Accordingly, the second capacitor $C_{1A}$ is set in the parallel configuration and the multi-tap transformer TX is set in a low turns-ratio configuration. In other words, by opening the first switch S1 and shorting the second switch S2, the second capacitor $C_{1A}$, which has an impedance of $-j\beta X$, is configured in series with the third capacitor $C_{1B}$, which has an impedance of $-j(1-\beta)X$. Moreover, the second capacitor $C_{1A}$ and the third capacitor $C_{1B}$ are configured in parallel with the base system induction coil $L_1$, which has an impedance of jX, to form a parallel resonant network. In this configuration, the characteristic impedance of the LCL network is X. An equivalent circuit of this parallel compensation configuration is shown in FIG. 12B, above.

FIG. 15 is a schematic diagram of a base wireless charging system 1502 having a multi-tap transformer in a partial-series configuration, according to one embodiment. In various embodiments, the base wireless charging system 1502 can include, for example, any of the base wireless charging systems 102a, 102b, 202, 302, and 1302 described above with respect to FIGS. 1-3 and 8, respectively. As shown, the base wireless charging system 1502 includes the inverter bridge H, the first capacitor $C_B$, the first inductor $L_B$, the multi-tap transformer TX, the first switch S1, the second switch S2, the second capacitor $C_{1A}$, the third capacitor $C_{1B}$, the fourth capacitor $C_{TX1}$, the fifth capacitor $C_{TX2}$, and the base system induction coil $L_1$. The effective load R represents the receiver-side load such as, for example, the electric vehicle charging system 114, 214, and/or 314, described above with respect to FIGS. 1-3, respectively. The effective load R can also include losses that can be inherent to induction coils (for example, the base system induction coil $L_1$) and anti-reactance capacitors (for example, the second and third capacitors $C_{1A}$ and $C_{1B}$).

Although various portions of the wireless charging system 1502 are shown in FIG. 15, the person having ordinary skill in the art will appreciate that one or more portions can be removed, replaced, or rearranged, or other portions can be included. Moreover, various capacitors, inductors, and/or resistors described herein can be replaced with equivalent circuits (for example, by integrating multiple components into the single component, splitting single components into multiple components, etc.).

In the illustrated embodiment of FIG. 15, the first switch S1 is closed and the second switch S2 is open. Accordingly, the second capacitor $C_{1A}$ is set in the partial-series configuration and the multi-tap transformer TX is set in a high turns-ratio configuration. In other words, by shorting the first switch S1 and opening the second switch S2, the second capacitor $C_{1A}$, which has an impedance of $-j\beta X$, is configured in series with the base system induction coil $L_1$, which has an impedance of jX. Moreover, the second capacitor $C_{1A}$ and the base system induction coil $L_1$ are configured in parallel with the third capacitor $C_{1B}$, which has an impedance of $-j(1-\beta)X$, to form a parallel resonant network. In this configuration, the characteristic impedance of the LCL network is $(1-\beta)X$. In other words, the base system output current $I_1$ is increased by a factor of $1/(1-\beta)$ on top of any increase due to changes in the TX turns ratio. An equivalent circuit of this parallel compensation configuration is shown in FIG. 12C, above.

Figure 16:
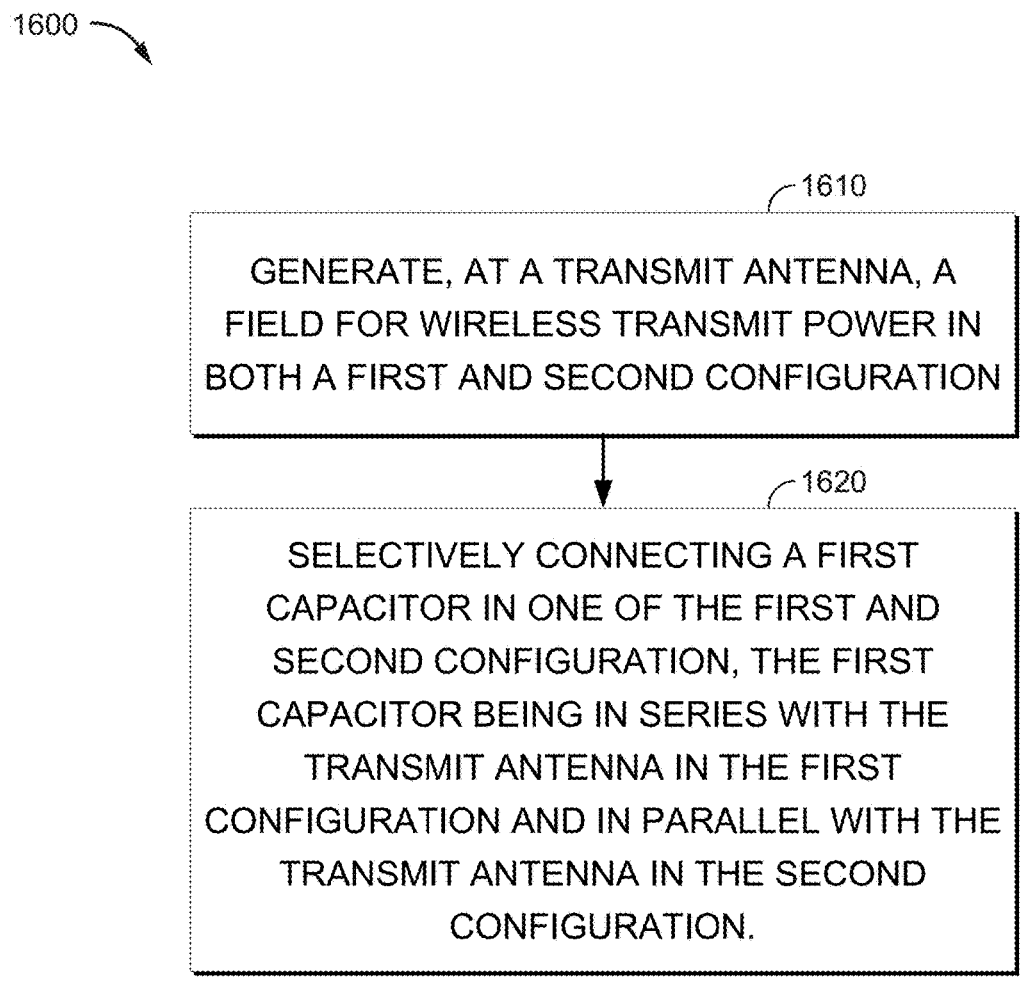
FIG. 16 is a flowchart of an exemplary method of wireless power transmission.

FIG. 16 is a flowchart 1600 of an exemplary method of wireless power transmission. Although the method of flowchart 1600 is described herein with reference to the wireless power transfer systems 100, 200, and 300 discussed above with respect to FIGS. 1-3, the base wireless charging systems 102, 202, 302, 802, 902A, 902B, 1002A, 1002B, 1202A, 1202B, 1202C, 1302, 1402, and 1502 discussed above with respect to FIGS. 1-3 and 8-15, a person having ordinary skill in the art will appreciate that the method of flowchart 1600 can be implemented by another device described herein, or any other suitable device. In an embodiment, the steps in flowchart 1600 can be performed by a processor or controller such as, for example, the controller 432 (FIG. 3). Although the method of flowchart 1600 is described herein with reference to a particular order, in various embodiments, blocks herein can be performed in a different order, or omitted, and additional blocks can be added.

First, at block 1610, the base wireless charging system 102 generates, at a transmit antenna, a field for wireless transmit power in both a first and second configuration. For example, the inverter bridge H of the base wireless charging system 802 can power the base system induction coil $L_1$ to generate the field, as discussed above with respect to FIG. 8.

Then, at block 1620, the base wireless charging system 102 selectively connects a first capacitor in one of the first and second configuration. The first capacitor is in series with the transmit antenna in the first configuration and in parallel with the transmit antenna in the second configuration. For example, the base charging system controller 342 can selectively open and close the first and second switches S1 and S2 so as to connect the capacitor $C_{1A}$ in the parallel or partial-series configurations, such as in the manner discussed above with respect to FIGS. 10A and 10B, respectively.

In an embodiment, the base wireless charging system 102 can connect the first capacitor in parallel with a second capacitor in the first configuration and in series with the second capacitor in the second configuration. The second capacitor can be in parallel with the transmit antenna. For example, when the base charging system controller 342 connects the capacitor $C_{1A}$ in the parallel configuration, the capacitor $C_{1A}$ can be in series with the capacitor $C_{1B}$, such as in the manner discussed above with respect to FIG. 10A. When the base charging system controller 342 connects the capacitor $C_{1A}$ in the partial-series configuration, the capacitor $C_{1A}$ can be in parallel with the capacitor $C_{1B}$, such as in the manner discussed above with respect to FIG. 10A.

In an embodiment, the wireless power transmitter can include a third capacitor in series with at least one switch. For example, the base wireless charging systems 1202A-1202C can include one or both of the capacitors $C_{TX1}$ and $C_{TX2}$, as discussed above with respect to FIGS. 12A-12C. In an embodiment, the third capacitor is configured to compensate for an additional reactive loading present in the first configuration. For example, the third capacitor including $C_{TX1}$ and/or $C_{TX2}$ can compensate for the additional reactive component $j\beta X$ when the capacitor $C_{1A}$ is in the partial-series configuration. In an embodiment, the third capacitor can have a characteristic impedance of $-j\beta X$.

In an embodiment, the base wireless charging system 102 can connect the first capacitor via at least one switch not part of a resonant path. For example, the base charging system controller 342 can operate the first and second switches S1 and S2 of the base wireless charging system 802, as discussed above with respect to FIG. 8. The switches S1 and S2 are not part of the resonant path including the capacitors $C_{1A}$ and $C_{1B}$ and the base system induction coil $L_1$.

In an embodiment, the base wireless charging system 102 can selectively connect the first capacitor in one of the first and second configuration based on a coupling between the transmit antenna and a receiver. For example, the base charging system controller 342 can select one of the parallel and partial-series configuration so as to maintain the inverter output voltage $V_i$. In an embodiment, the base wireless charging system 102 can measure the coupling between the transmit antenna and the receiver, and compare the coupling to a threshold.

In an embodiment, the base wireless charging system 102 can configure a multi-tap transformer to operate at a first turns-ratio in the first configuration and a second turns-ratio in the second configuration. The first turns-ratio can be higher than the second turns-ratio. For example, the base charging system controller 342 can operate the first and second switches S1 and S2 of the base wireless charging system 1302 so as to selectively tap the multi-tap transformer TX, as discussed above with respect to FIG. 13.

Figure 17:
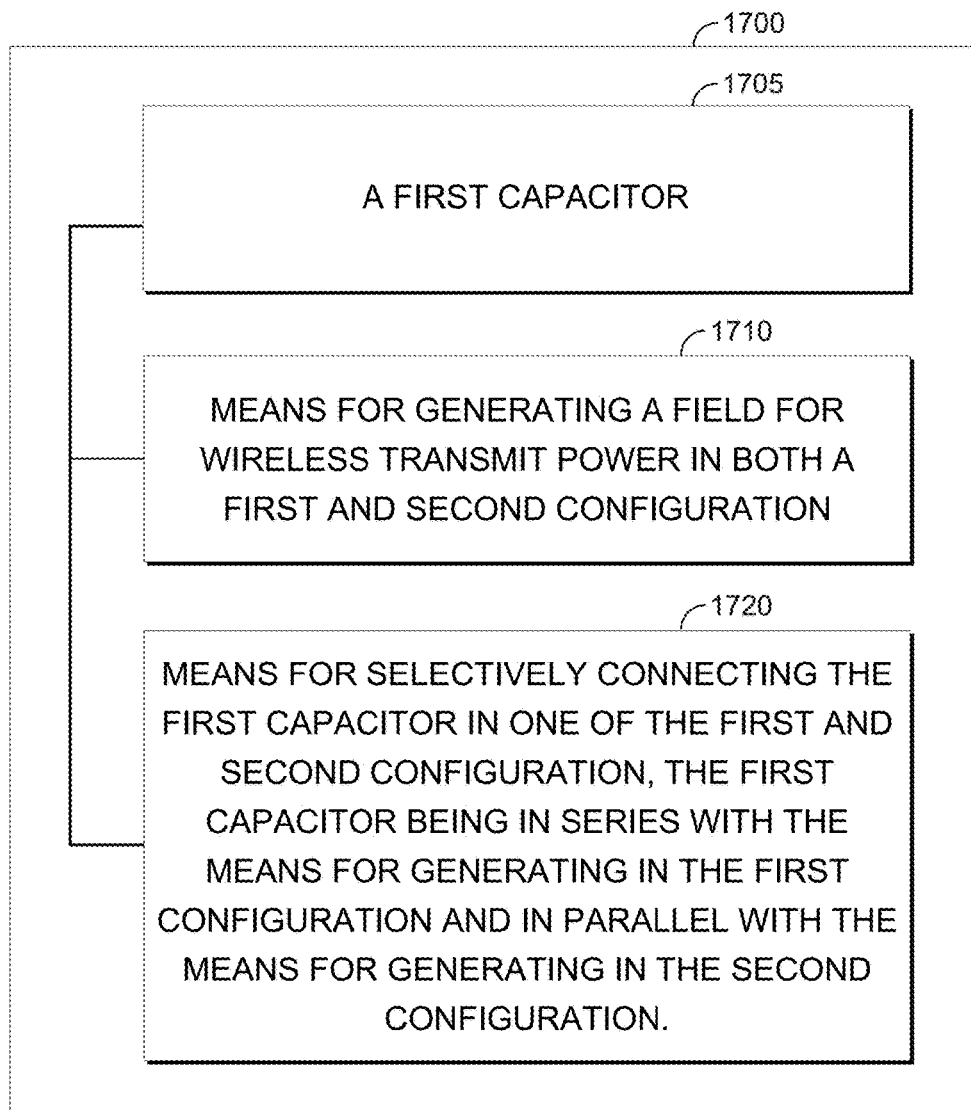
FIG. 17 is a functional block diagram of an apparatus for transmitting wireless charging power, in accordance with an embodiment of the invention.

FIG. 17 is a functional block diagram of an apparatus 1700 for transmitting wireless charging power, in accordance with an embodiment of the invention. Those skilled in the art will appreciate that an apparatus for wireless communication can have more components than the simplified apparatus 1700 shown in FIG. 17. The apparatus 1700 for transmitting wireless charging power shown includes only those components useful for describing some prominent features of implementations within the scope of the claims. The apparatus 1700 for transmitting wireless charging power includes a first capacitor 1705, means 1710 for generating a field for wireless transmit power in both a first and second configuration, and means 1720 for selectively connecting the first capacitor in one of the first and second configuration, the first capacitor being in series with the means for generating in the first configuration and in parallel with the means for generating in the second configuration.

In an embodiment, the first capacitor 1705 can include, for example, the capacitor $C_{1A}$ discussed above with respect to FIGS. 8-15. In some embodiments, the first capacitor 1705 can instead be a means for storing charge, a means for adjusting a characteristic impedance, means for reactance, etc.

In an embodiment, means 1710 for generating a field for wireless transmit power in both a first and second configuration can be configured to perform one or more of the functions described above with respect to block 1610 (FIG. 16). In various embodiments, the means 1710 for generating a field for wireless transmit power in both a first and second configuration can be implemented by one or more of the base charging system controller 342, the coils 104A (FIG. 1), 104B (FIG. 1), 204 (FIG. 2), 304 (FIG. 3), and $L_1$ (FIGS. 8-15), the inverters H (FIGS. 8-15), the base system transmit circuit 206 (FIG. 2), and the base charging system power converter 236 (FIG. 2).

In an embodiment, means 1720 for selectively connecting the first capacitor in one of the first and second configuration can be configured to perform one or more of the functions described above with respect to block 1620 (FIG. 16). In various embodiments, the means 1720 for selectively connecting the first capacitor in one of the first and second configuration can be implemented by one or more of the base charging system controller 342, the coils 104A (FIG. 1), and the first and second switches S1 and S2 (FIGS. 8-15).

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

Information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the embodiments of the invention.

The various illustrative blocks, modules, and circuits described in connection with the embodiments disclosed herein can be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein can be embodied directly in hardware, in a software module executed by a processor, or in a combination of the two. If implemented in software, the functions can be stored on or transmitted over as one or more instructions or code on a tangible, non-transitory computer-readable medium. A software module can reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium can be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium can reside in an ASIC. The ASIC can reside in a user terminal. In the alternative, the processor and the storage medium can reside as discrete components in a user terminal.

For purposes of summarizing the disclosure, certain aspects, advantages and novel features of the inventions have been described herein. It is to be understood that not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

Various modifications of the above described embodiments will be readily apparent, and the generic principles defined herein can be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transmitter comprising:
   a transmit antenna configured to generate a field for wireless power transfer;
   a first capacitor;
   at least one switch configured to selectively connect the first capacitor in parallel with the transmit antenna in a first configuration and in series with the transmit antenna in a second configuration;
   a second capacitor connected in parallel with the transmit antenna; and
   a multi-tap transformer having a first turns-ratio and a second turns-ratio, the first turns-ratio being lower than the second turns-ratio,
   the at least one switch further configured to select the first turns-ratio for the transformer in the first configuration and select the second turns-ratio for the transformer in the second configuration.

2. The wireless power transmitter of claim 1, wherein the first capacitor is in series with the second capacitor in the first configuration and in parallel with the second capacitor in the second configuration.

3. The wireless power transmitter of claim 1, further comprising a third capacitor in series with the at least one switch.

4. The wireless power transmitter of claim 3, wherein the third capacitor is configured to compensate for an additional reactive loading present in the first configuration.

5. The wireless power transmitter of claim 3, wherein the at least one switch comprises:
   a first switch having a first terminal electrically coupled to a second terminal of the third capacitor and having a second terminal electrically coupled to a second terminal of the first capacitor and to a first terminal of the second capacitor; and
   a second switch having a first terminal electrically coupled to a second terminal of a fourth capacitor and having a second terminal electrically coupled to a first terminal of the first capacitor and to a first terminal of the transmit antenna.

6. The wireless power transmitter of claim 5, wherein the first switch is configured to connect the first capacitor in the first configuration.

7. The wireless power transmitter of claim 3, the transformer having:
   a first terminal electrically coupled to a first terminal of the third capacitor,
   a second terminal electrically coupled to a first terminal of a fourth capacitor, and
   a third terminal electrically coupled to a second terminal of the second capacitor and to a second terminal of the transmit antenna.

8. The wireless power transmitter of claim 1, wherein the at least one switch is not part of a resonant path.

9. A method of transmitting wireless charging power in a wireless power transmitter, comprising:
   generating, at a transmit antenna, a field for wireless power transfer;
   selectively connecting a first capacitor, via at least one switch, in parallel with the transmit antenna in a first configuration and in series with the transmit antenna in a second configuration, the transmit antenna connected in parallel with a second capacitor;

selectively configuring a multi-tap transformer having a first turns-ratio and a second turns-ratio, the first turns-ratio being higher than the second turns-ratio, to operate with the first turns-ratio in the first configuration and to operate with the second turns-ratio in the second configuration via the at least one switch.

10. The method of claim 9, wherein the first capacitor is in series with the second capacitor in the first configuration and in parallel with the second capacitor in the second configuration.

11. The method of claim 9, wherein the wireless power transmitter comprises a third capacitor in series with the at least one switch.

12. The method of claim 11, wherein the third capacitor is configured to compensate for an additional reactive loading present in the first configuration.

13. The method of claim 11, wherein the at least one switch comprises:
a first switch having a first terminal electrically coupled to a second terminal of the third capacitor and having a second terminal electrically coupled to a second terminal of the first capacitor and to a first terminal of the second capacitor; and
a second switch having a first terminal electrically coupled to a second terminal of a fourth capacitor and having a second terminal electrically coupled to a first terminal of the first capacitor and to a first terminal of the transmit antenna.

14. The method of claim 13, wherein the first switch is configured to connect the first capacitor in the first configuration.

15. The method of claim 11, the transformer having:
a first terminal electrically coupled to a first terminal of the third capacitor,
a second terminal electrically coupled to a first terminal of a fourth capacitor, and
a third terminal electrically coupled to a second terminal of the second capacitor and to a second terminal of the transmit antenna.

16. The method of claim 9, wherein the at least one switch is not part of a resonant path.

17. An apparatus for transmitting wireless charging power, comprising:
a first capacitor;
means for generating a field for wireless power transfer;
a second capacitor in parallel with the means for generating the field;
means for selectively connecting the first capacitor in parallel with the means for generating in a first configuration and in series with the means for generating in a second configuration; and
means for isolating having a first turns-ratio and a second turns-ratio, the first turns-ratio being higher than the second turns-ratio,
the means for selectively connecting configured to select the first turns-ratio for the means for isolating in the first configuration and select the second turns-ratio for the means for isolating in the second configuration.

18. The apparatus of claim 17, wherein the means for selectively connecting connects the first capacitor in series with the second capacitor in the first configuration and in parallel with the second capacitor in the second configuration.

19. The apparatus of claim 17, further comprising a third capacitor in series with the means for selectively connecting.

20. The apparatus of claim 19, wherein the third capacitor is configured to compensate for an additional reactive loading present in the first configuration.

21. The apparatus of claim 19, wherein the means for selectively connecting the first capacitor comprises:
a first means for selectively connecting having a first terminal electrically coupled to a second terminal of the third capacitor and having a second terminal electrically coupled to a second terminal of the first capacitor and to a first terminal of the second capacitor; and
a second means for selectively connecting having a first terminal electrically coupled to a second terminal of a fourth capacitor and having a second terminal electrically coupled to a first terminal of the first capacitor and to the means for generating.

22. The apparatus of claim 19, wherein the means for isolating comprises:
a first terminal electrically coupled to a first terminal of the third capacitor,
a second terminal electrically coupled to a first terminal of a fourth capacitor, and
a third terminal electrically coupled to a second terminal of the second capacitor and to a second terminal of the means for generating.

23. The apparatus of claim 17, wherein the means for selectively connecting is not part of a resonant path.

24. A non-transitory computer-readable medium comprising code that, when executed, causes an apparatus to:
generate, at a transmit antenna, a field for wireless power transfer;
selectively connect, via at least one switch, a first capacitor in parallel with the transmit antenna in a first configuration and in series with the transmit antenna in a second configuration, wherein the apparatus comprises a second capacitor in parallel with the transmit antenna; and
selectively configure, via the at least one switch, a multi-tap transformer having a first turns-ratio and a second turns-ratio, the first turns-ratio being higher than the second turns-ratio, to operate with the first turns-ratio in the first configuration and to operate with the second turns-ratio in the second configuration.

25. The medium of claim 24, further comprising code that causes the apparatus to connect the first capacitor in series with the second capacitor in the first configuration and in parallel with the second capacitor in the second configuration.

26. The medium of claim 24, wherein the apparatus comprises a third capacitor in series with the at least one switch.

27. The medium of claim 26, wherein the third capacitor is configured to compensate for an additional reactive loading present in the first configuration.

28. The medium of claim 26, wherein the apparatus comprises:
a first switch having a first terminal electrically coupled to a second terminal of the third capacitor and having a second terminal electrically coupled to a second terminal of the first capacitor and to a first terminal of the second capacitor; and
a second switch having a first terminal electrically coupled to a second terminal of a fourth capacitor and having a second terminal electrically coupled to a first terminal of the first capacitor and to a first terminal of the transmit antenna.

29. The medium of claim 26, wherein the transformer comprises a multi-tap transformer having:

a first terminal electrically coupled to a first terminal of the third capacitor,
a second terminal electrically coupled to a first terminal of a fourth capacitor, and
a third terminal electrically coupled to a second terminal of the second capacitor and to a second terminal of the transmit antenna.

30. The medium of claim 24, wherein the at least one switch not part of a resonant path.

* * * * *